(12) United States Patent
Sakurada

(10) Patent No.: US 11,586,990 B2
(45) Date of Patent: Feb. 21, 2023

(54) CAR-SHARING SYSTEM, INFORMATION PROCESSING APPARATUS, INFORMATION PROCESSING METHOD, INFORMATION PROCESSING PROGRAM

(71) Applicant: TOYOTA JIDOSHA KABUSHIKI KAISHA, Toyota (JP)

(72) Inventor: Shin Sakurada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 543 days.

(21) Appl. No.: 16/375,229

(22) Filed: Apr. 4, 2019

(65) Prior Publication Data

US 2019/0318275 A1 Oct. 17, 2019

(30) Foreign Application Priority Data

Apr. 16, 2018 (JP) .............................. JP2018-078717

(51) Int. Cl.
*G06Q 10/02* (2012.01)
*G01C 21/34* (2006.01)
*G06Q 50/30* (2012.01)

(52) U.S. Cl.
CPC ......... *G06Q 10/02* (2013.01); *G01C 21/3438* (2013.01); *G06Q 50/30* (2013.01)

(58) Field of Classification Search
CPC ..... G06Q 10/02; G06Q 50/30; G01C 21/3438
See application file for complete search history.

(56) References Cited

U.S. PATENT DOCUMENTS

2012/0330696 A1 12/2012 Clark et al.
2013/0321178 A1* 12/2013 Jameel .................... H04W 4/40
340/989

(Continued)

FOREIGN PATENT DOCUMENTS

JP 2012-048461 A 3/2012
JP 2012-048466 A 3/2012

(Continued)

OTHER PUBLICATIONS

Shaheen, Susan A.., Mark A. Mallery, Karla J. Kingsley, "Personal vehicle sharing services in North America", 2012, Research in Transportation Business & Management, vol. 3, pp. 71-81 (Year: 2012).*

(Continued)

*Primary Examiner* — Jeff Zimmerman
*Assistant Examiner* — Wayne S. Murray
(74) *Attorney, Agent, or Firm* — Oliff PLC

(57) ABSTRACT

A car-sharing system for vehicles including private and/or corporate-owned vehicles receives, from a user's terminal, a use reservation for one of the vehicles available at a parking station in the vicinity of the departure location during the user's desired period, and one of parking stations located in the vicinity of the destination location where the vehicle can be returned at the user's desired time, to register the use reservation in vehicle/parking station schedule information; and makes a use reservation, with respect to a period registered in the vehicle schedule information for the owner to use the vehicle, for another vehicle different from the vehicle from among the vehicles available during the period, and for a predetermined parking station from among the parking stations at which said another vehicle can be returned within the period, to register the use reservation in the vehicle/parking station schedule information.

9 Claims, 6 Drawing Sheets

(56) References Cited

U.S. PATENT DOCUMENTS

2015/0206206 A1\* 7/2015 Puente ............... G06Q 30/0645
                                                    705/307
2015/0348178 A1\* 12/2015 Taylor ................ G06Q 30/0645
                                                    705/307
2017/0147951 A1\* 5/2017 Meyer .................... G06Q 50/14

FOREIGN PATENT DOCUMENTS

| JP | 2015-049735 A | 3/2015 |
| JP | 2015-069584 A | 4/2015 |
| WO | 2015049735 A1 | 4/2015 |

OTHER PUBLICATIONS

Dec. 7, 2021 Office Action issued in Japanese Patent Application No. 2018-078717.

\* cited by examiner

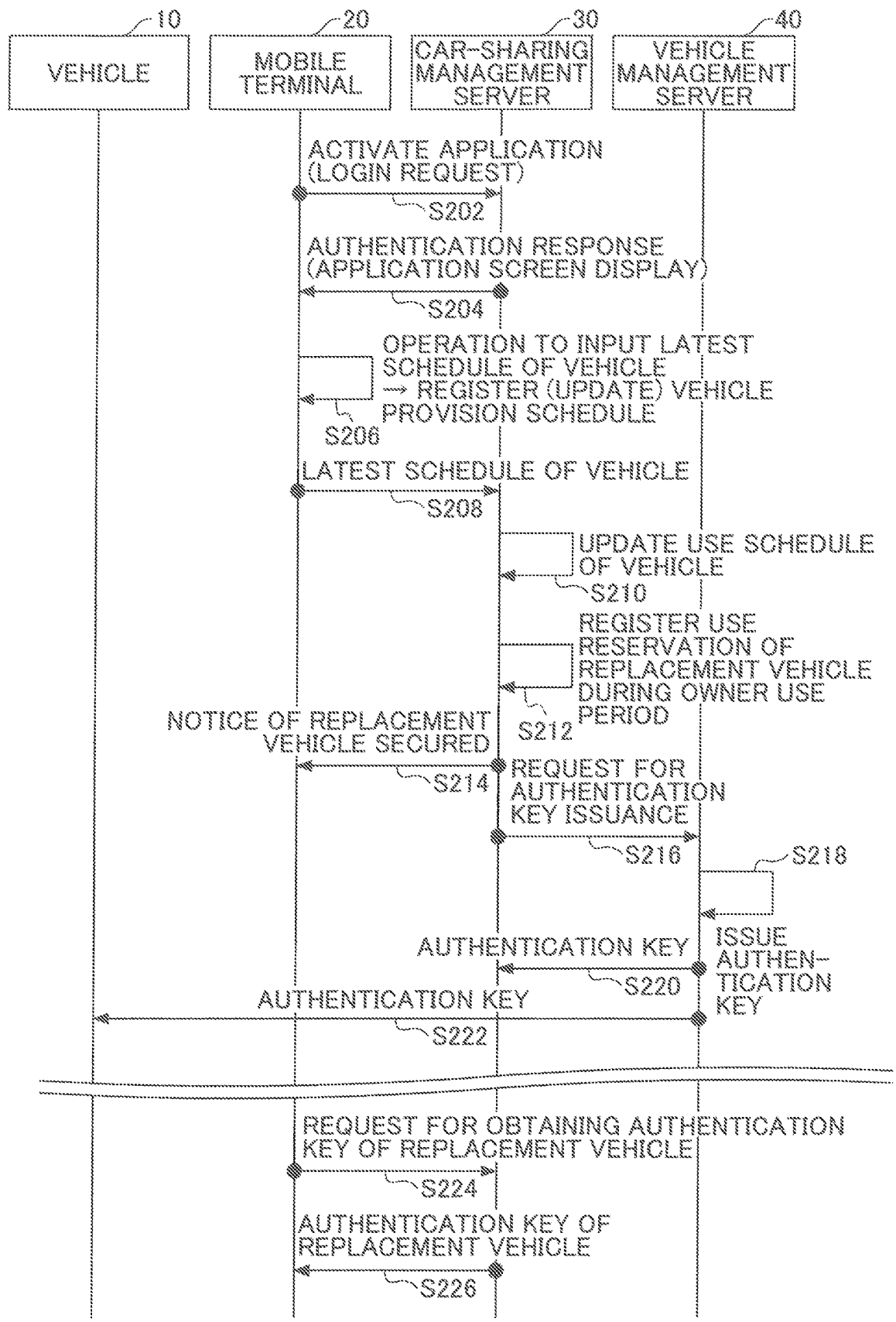

CAR-SHARING SYSTEM, INFORMATION PROCESSING APPARATUS, INFORMATION PROCESSING METHOD, INFORMATION PROCESSING PROGRAM

CROSS-REFERENCE TO RELATED APPLICATIONS

This application is based on and claims priority to Japanese patent application No. 2018-078717 filed on Apr. 16, 2018, the entire contents of which are hereby incorporated by reference.

FIELD

The present disclosure relates to a car-sharing system and the like.

BACKGROUND

Technologies nave been known that relate to B2C (Business to Consumer) type car-sharing services (referred to as "B2C car-sharing", below) that enable a user to use a mobile terminal to lock and unlock the doors of a vehicle so as to use the vehicle (see, for example, Japanese Unexamined Patent Application Publication No. 2015-69584).

For example, Japanese Unexamined Patent Application Publication No. 2015-69534 discloses a technology related to B2C car-sharing that allows a user to return a vehicle to a different station from the station corresponding to the departure location, namely, allows one-way use.

However, in the case of B2C car-sharing, since it is often the case that stations are placed at locations where the demand is expected to a certain extent, there is a likelihood that a user of the service needs to visit a station away from the departure location, such as the home of the user, to use the vehicle.

In contrast, in the case of a C2C (Consumer to Consumer) type car-sharing service (referred to as "C2C car-sharing", below) in which privately owned vehicles and/or corporate-owned vehicles are shared to be used, when a large number of privately owned vehicles and corporate-owned vehicles are registered, there is a higher likelihood that a user of the service can borrow a vehicle of a provider in the vicinity of the departure location such as the home of the user.

However, in the case of C2C car-sharing, it is normally necessary for the user to return the borrowed vehicle to the original location (home location), for example, a parking lot adjacent to the home of the owner. Therefore, in the case of C2C car-sharing, there is a likelihood that the user cannot enjoy one-way use to return the vehicle to a location different from the departure location.

As such, B2C car-sharing and C2C car-sharing have respective advantages and disadvantages, and there is room for improvement in convenience to users in the car-sharing services.

Thereupon, in view of the above problems, it is an object in the present disclosure to provide a car-sharing system and the like that are capable of further improving convenience to users in the car-sharing service.

SUMMARY

In order to achieve the above object, according to one embodiment in the present disclosure, a car-sharing system with respect to a car-sharing service in which a plurality of vehicles including at least one of a privately owned vehicle and a corporate-owned vehicle are shared to be used among a plurality of users, the car-sharing service being operated by a company different from a corporation as an owner of the corporate-owned vehicle, the car-sharing system includes a first storage configured to store vehicle schedule information on respective use schedules of the plurality of vehicles; a second storage configured to store parking station schedule information on respective use schedules of a plurality of parking stations arranged in advance for parking the vehicles; a reservation processor configured, based on the vehicle schedule information and the parking station schedule information, to receive, from a user through a user terminal, a use reservation for a vehicle from among the plurality of vehicles available at a parking station in the vicinity of a departure location of the user during a period desired by the user, and for a parking station from among the plurality of parking stations located in the vicinity of a destination location of the user at which the vehicle can be returned at a time desired by the user, to register the use reservation in the vehicle schedule information in the first storage and in the parking station schedule information in the second storage; and a key information delivery unit configured to deliver key information for using the vehicle corresponding to the use reservation registered in the vehicle schedule information, to a mobile terminal of the user corresponding to the use reservation. The reservation processor makes a use reservation, with respect to a period registered in the vehicle schedule information for an owner of the vehicle or a person connected with the owner to use the vehicle, for another vehicle different from the vehicle from among the plurality of vehicles available during the period, and for a predetermined parking station from among the plurality of parking stations at which the other vehicle can be returned within the period; and registers the use reservation in the vehicle schedule information in the first storage and in the parking station schedule information in the second storage. The key information delivery unit delivers key information for using the other vehicle to a mobile terminal of the owner of the vehicle or the person connected with the owner.

According to this embodiment, the car-sharing system receives a use reservation for a vehicle from among multiple vehicles including at least one of a privately owned vehicle and a corporate-owned vehicle located in the vicinity of a departure location of a user during a period desired by the user. Therefore, when a large number of privately owned vehicles and corporate-owned vehicles are registered, the user can borrow a vehicle in the vicinity of the departure location, for example, the home of the user or the like. Also, the car-sharing system receives the use reservation for a parking station from among multiple parking stations in the vicinity of the destination location of the user at which the vehicle can be returned at a time desired by the user. Therefore, by setting a destination location different from the departure location, the user can enjoy one-way use, which is to return the vehicle to a parking station in the vicinity of the destination location. Meanwhile, the car-sharing system automatically makes a use reservation for a replacement vehicle (another vehicle) different from the vehicle, with respect to a period for an owner of the vehicle provided for shared use or a person connected with the owner (e.g., a family member, relative, close friend, etc. of the owner, referred to as "the owner or the like", below) to use the vehicle. Therefore, the owner or the like providing the vehicle in the car-sharing service can use the replacement vehicle during a period registered in advance for the owner or the like to use the providing vehicle, even if the providing vehicle has gone to a parking station away from the home location due to one-way use. As such, the car-sharing system provides a vehicle in the vicinity of a departure location of the user, and one-way use of the vehicle while maintaining convenience to the owner or the like of the vehicle, and thus, can further improve the convenience to the users.

Also, in the above embodiment, the reservation processor may make the use reservation, with respect to the period registered in the vehicle schedule information for the owner of the vehicle or the person connected with the owner to use the vehicle, for a vehicle that is parked at a parking station in the vicinity of a home location of the vehicle as the other vehicle, and for a parking station in the vicinity of the home location of the vehicle as the predetermined parking station; and register the use reservation in the vehicle schedule information in the first storage and in the parking station schedule information in the second storage.

According to this embodiment, the car-sharing system makes the use reservation for a replacement vehicle and a parking station as the return location in a form where the home location of the providing vehicle is set as the departure location and the destination location with respect to the period for the owner or the like to use the providing vehicle. Therefore, even if the providing vehicle has gone to a parking station different from the home location due to one-way use of the providing vehicle within the period for the owner or the like of the providing vehicle to use the providing vehicle, the owner or the like can use the replacement vehicle, and can return it to a parking station in the vicinity of his/her house.

Also, in the above embodiment, the reservation processor may change, in response to a request from a user terminal corresponding to the owner of the vehicle or the person connected with the owner, the other vehicle of the use reservation having been registered in the vehicle schedule information with respect to the period for the owner of the vehicle or the person connected with the owner to use the vehicle, to yet another vehicle being parked in the parking station in the vicinity of the departure location different from the home location of the vehicle during the period.

According to this embodiment, in response to a request from a user terminal of the owner or the like of the providing vehicle, the car-sharing system changes the replacement vehicle of the use reservation with respect to the period for the owner or the like to use the vehicle, to another replacement vehicle in the parking station in the vicinity of the departure location different from the home location of the providing vehicle. Therefore, since the owner or the like of the providing vehicle can change the departure location of the replacement vehicle afterward, the convenience to the owner or the like of the providing vehicle is improved.

Also, in the above embodiment, the reservation processor may change, in response to a request from a user terminal corresponding to the owner of the vehicle or the person connected with the owner, the predetermined parking station of the use reservation having been registered in the parking station schedule information with respect to the period for the owner of the vehicle or the person connected with the owner to use the vehicle, to a parking station in the vicinity of the destination location different from the home location of the vehicle.

According to this embodiment, in response to a request from a user terminal of the owner or the like of the providing vehicle, the car-sharing system changes the parking station as the return location of the replacement vehicle of the use reservation with respect to the period for the owner or the like to use the vehicle, to a parking station in the vicinity of the destination location different from the home location of the providing vehicle. Accordingly, since the owner or the like of the providing vehicle can change the destination location of the replacement vehicle afterward, the convenience to the owner or the like of the providing vehicle is improved.

Also, in the above embodiment, the reservation processor may make the use reservation, in response to a request from a user terminal corresponding to the owner of the vehicle or the person connected with the owner, with respect to the period registered in the vehicle schedule information for the owner of the vehicle or the person connected with the owner to use the vehicle, for a vehicle being parked at the parking station in the vicinity of the departure location specified in the request as the other vehicle, and for a parking station in the vicinity of the destination location specified in the request as the predetermined parking station; and registers the use reservation in the vehicle schedule information in the first storage and in the parking station schedule information in the second storage.

According to this embodiment, the car-sharing system makes a use reservation, with respect to the period for the owner or the like to use the vehicle, for a replacement vehicle and a parking station as the return location corresponding to the departure location and the destination location specified in a request from a user terminal of the owner or the like to use the providing vehicle. Therefore, when registering a schedule of the providing vehicle from a mobile terminal or the like of his/her own, the owner or the like of the providing vehicle may specify the departure location and the destination location for each period for the owner or the like to use the providing vehicle, so that he/she can have a replacement vehicle provided at his/her convenience. Therefore, the car-sharing system can improve the convenience to the owner or the like of the providing vehicle.

Also, in the above embodiment, the reservation processor may make the use reservation, with respect to the period registered in the vehicle schedule information for the owner of the vehicle or the person connected with the owner to use the vehicle, for a vehicle being parked at the parking station in the vicinity of the departure location registered in advance as the other vehicle, and for a parking station in the vicinity of the destination location registered in advance as the predetermined parking station; and register the use reservation in the vehicle schedule information in the first storage and in the parking station schedule information in the second storage.

According to this embodiment, the car-sharing system makes the use reservation with respect to the period for the owner or the like to use the providing vehicle, for a replacement vehicle and a parking station as the return location corresponding to the departure location and the destination location that are registered in advance. Therefore, by registering in advance the departure location and the destination location of the use reservation with respect to the period for the owner or the like to use the providing vehicle, the owner or the like of the providing vehicle can have a replacement vehicle provided at his/her convenience. Therefore, the car-sharing system can improve the convenience to the owner or the like of the providing vehicle.

Also, in the above embodiments, the plurality of parking stations may include parking stations corresponding to home locations of at least some of the plurality of vehicles registered in advance.

According to this embodiment, the car-sharing system can use, as targets of shared use, not only the providing vehicle but also the home location of the providing vehicle (e.g., the parking lot at the home of the owner) as a parking station of another providing vehicle. Therefore, when a large number of privately owned vehicles and corporate-owned vehicles are registered, and consequently, the home locations of these vehicles that would be spread over various places are registered as parking stations, it becomes easier for the user to be provided with a vehicle in the vicinity of the departure location such as the home of the user and/or a parking station in the vicinity of the destination location. Therefore, the car-sharing system can further improve the convenience to the user.

Also, in the above embodiments, the reservation processor may prioritize, when registering in the vehicle schedule information in the first storage and in the parking station schedule information in the second storage, a use reservation with respect to the period for the owner of the vehicle or the person connected with the owner to use the vehicle, over a use reservation received from the user terminal of the user.

According to this embodiment, the car-sharing system can more securely make the use reservation for the replacement vehicle with respect to the period for the owner or the like to use the providing vehicle, and the parking station as the return location. Therefore, the car-sharing system can more securely maintain the convenience to the owner or the like of the providing vehicle.

The embodiments in the present disclosure can also be realized in other forms such as an information processing apparatus, an information processing method, and an information processing program.

According to the embodiments described above, it is possible to provide a car-sharing system or the like that can further improve convenience for the users in a car-sharing service.

BRIEF DESCRIPTION OF THE DRAWINGS

FIG. 5 is a sequence chart schematically illustrating another example of the operation of the car-sharing system.

DETAILED DESCRIPTION OF EMBODIMENTS

In the following, embodiments will be described with reference to the drawings.

Outline of Car-Sharing System

First, with reference to FIG. 1, an outline of a car-sharing system 1 according to an embodiment will be described.

Figure 1:
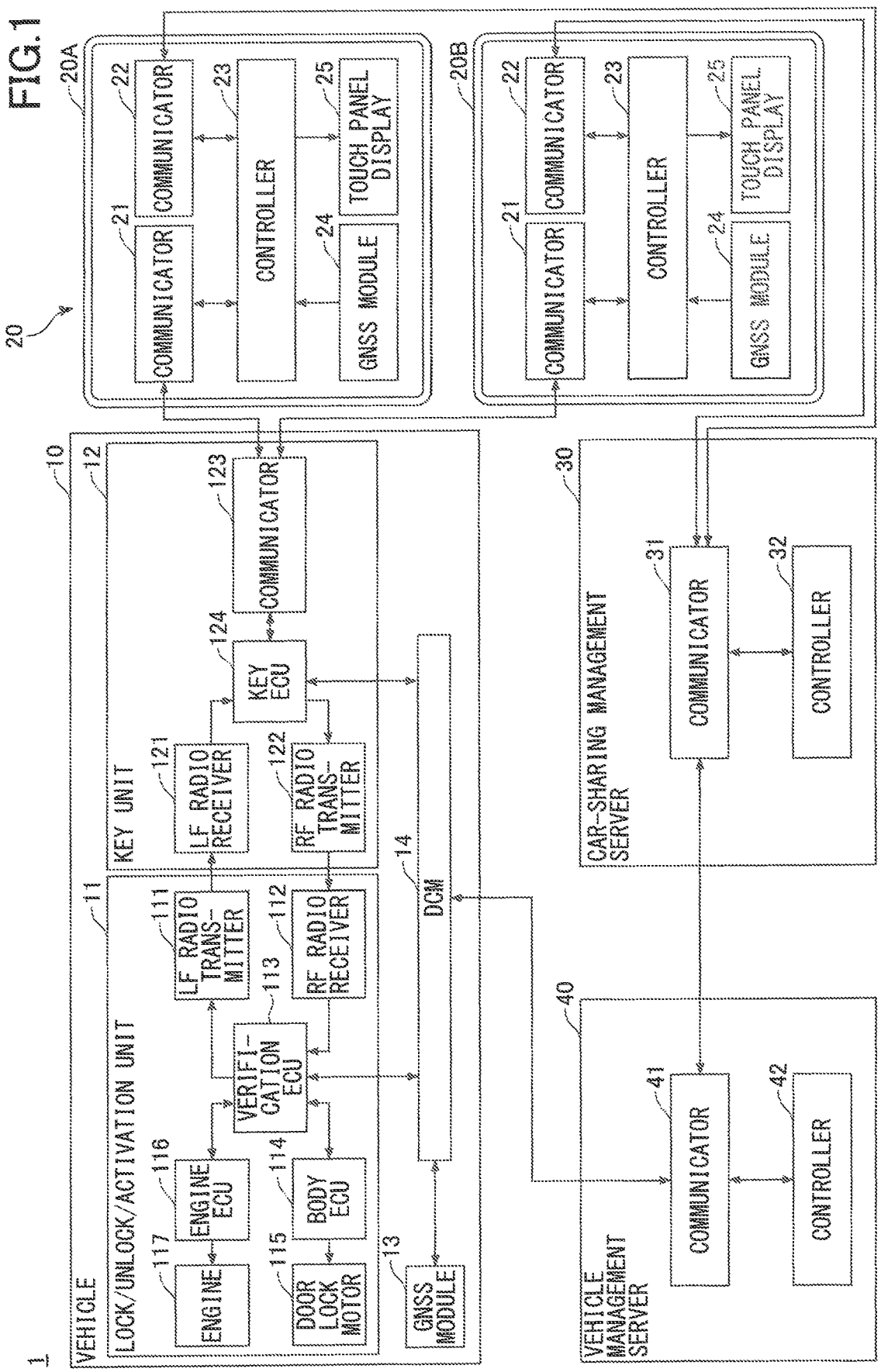
FIG. 1 is a configuration diagram illustrating an example of a car-sharing system.

FIG. 1 is a block diagram schematically illustrating a hardware configuration of an example of the car-sharing system (car-sharing system 1) according to the present embodiment.

The car-sharing system 1 according to the present embodiment includes multiple privately owned vehicles 10, mobile terminals 20 possessed by multiple users of C2C car-sharing, a car-sharing management server 30, and a vehicle management server 40.

Note that some or all of the functions of the car-sharing management server 30 and the vehicle management server 40 may be integrated into the other. Also, functions of the car-sharing management server 30 may be shared by multiple server devices, and the same applies to the vehicle management server 40.

The car-sharing system 1 implements a C2C type car-sharing service (C2C car-sharing) in which multiple privately owned vehicles 10 registered in advance under a predetermined contract between a company and the owners are shared to be used among multiple member users (simply referred to as "users", below) registered in advance under a predetermined contract between the company and applicants for the membership. The users may include not only a user who is not the owner of a vehicle 10 (referred to as a "general user", below) but also a user who is the owner of a vehicle 10 (referred to as a "vehicle providing user", below). This is because even a user who owns a certain vehicle 10 may want to borrow another vehicle 10 depending on circumstances (e.g., a case where another vehicle 10 is needed that has a greater riding capacity than his own vehicle 10). This is also because, as will be described later, there may a case where it is necessary to provide another vehicle 10 as a replacement vehicle for a vehicle providing user. Also, the users may include persons connected with the owner of a vehicle 10 (e.g., family members, relatives, close friends, etc. of the owner), as will be described later.

Also, the car-sharing system 1 allows one-way use of a vehicle 10 by a user (specifically, use of the vehicle 10 on the premise of returning to a parking station other than the home location of the vehicle 10). In accordance with this, as an alternative means when the vehicle 10 is not at the home location, the car-sharing system 1 allows the vehicle providing user of the vehicle 10 to use another vehicle 10 (a vehicle 10 owned by another vehicle providing user, namely, a replacement vehicle), with respect to a use period of the vehicle 10 owned by the vehicle providing user registered in advance by the vehicle providing user (referred to as the "owner use period", below).

Note that since the multiple vehicles 10 have the same configuration with respect to the car-sharing system 1, one of the multiple vehicles 10 is representatively illustrated in FIG. 1 as a representative. Also, among the multiple vehicles 10, all the vehicles 10 may be available for one-way use, or only some of the vehicles 10 may be available for one-way use.

Outline of Vehicle

Each of the multiple vehicles 10 is to be shared by multiple users in the C2C car-sharing. The multiple vehicles 10 are available (moveable), for example, in the entire service providing area of the C2C car-sharing. Alternatively, it may be assumed that the service providing area of the C2C car-sharing is divided into multiple subareas, and each vehicle 10 belongs a subarea that includes its home location, to be available (moveable) only in the belonging subarea.

The vehicle 10 is configured to be capable of short-range communication (e.g., BLE (Bluetooth (registered trademark) Low Energy) communication or NFC (Near Field Communication)) with the mobile terminal 20 by a predetermined method, to perform an authentication process based on an authentication key received from the authentication server 20. Then, if the authentication is successful, the vehicle 10 allows a user operation through the mobile terminal 20 or a direct user operation on the vehicle 10 related to locking and unlocking of the vehicle 10, activation of the vehicle 10, and the like. In other words, if the authentication is successful, the vehicle 10 allows the user of the corresponding mobile terminal 20 to use the vehicle 10 itself, such as locking and unlocking of a door, and activation.

Also, the vehicle 10 is communicably connected with the vehicle management server 40 through a predetermined communication network, which may include, for example, a mobile communication network having base stations at the ends, a satellite communication network using a communication satellite, and the Internet, to transmit and receive various signals with the vehicle management server 40.

Note that the multiple vehicles 10 may include not only privately owned vehicles 10 but also corporate-owned vehicles 10 (e.g., company cars) owned by corporations different from a company that operates the C2C car-sharing. Also, all of the multiple vehicles 10 may be owned by corporations different from the company that operates the C2C car-sharing. In this case, a vehicle providing user corresponds to a corporation that provides a vehicle 10 (or a company or an individual undertaking the management from the corporation).

Outline of Mobile Terminal

The mobile terminal 20 is a user terminal possessed by a user who shares the vehicles 10 to use.

The mobile terminal 20 receives an authentication key for using a vehicle 10 from the car-sharing management server 30 and transmits the authentication key to the vehicle 10 (the key unit 12 as will described later), so as to lock, unlock, and activate the vehicle 10 based on an operation performed by the user on the mobile terminal 20 or the vehicle 10.

The mobile terminals 20 include a mobile terminal 20A owned by a vehicle providing user as the owner of a vehicle 10 and a mobile terminal 20B possessed by a general user. In the following, when not distinguishing between the mobile terminal 20A and 20B, the term "mobile terminal 20" will be used in the description.

Note that since multiple mobile terminals 20A corresponding to multiple vehicle providing users have the same configuration with respect to the car-sharing system 1, in FIG. 1, one of the mobile terminals 20A possessed by one of the vehicles providing users corresponding to one of the vehicles 10 is illustrated representatively. Also, since multiple mobile terminals 20B corresponding to multiple general users have the same configuration with respect to the car-sharing system 1, in FIG. 1, one of the mobile terminals 20B possessed by one of the general users corresponding to one of the vehicles 10 is illustrated representatively.

Outline of Car-Sharing Management Server

The car-sharing management server 30 operates and manages the C2C car-sharing.

The car-sharing management server 30 manages, for example, use schedules of the vehicles 10 in the C2C car-sharing. A use schedule of a vehicle 10 includes not only a use schedule of the vehicle 10 in the C2C car-sharing but also a use schedule of the vehicle 10 by the owner (vehicle providing user). The car-sharing management server 30 also manages use schedules of multiple parking stations registered in advance, which serve as parking places and return locations of the vehicles 10. The multiple parking stations may include a parking station corresponding to the home location of a vehicle 10 (e.g., a parking lot at the home of an owner) provided by the owner of the vehicle 10 (referred to as the "owner providing station", below). Also, multiple parking stations may include a parking station (referred to as a "company providing station", below) prepared and provided in advance by a company that provides C2C car-sharing. Also, the owner providing station may be classified as a dedicated parking station only occupied by the owner's vehicle 10 (referred to as "owner-providing dedicated parking station", below) based on contract conditions and the like between the owner of the vehicle 10 and the company providing the C2C car-sharing Station; and a parking station that are available as the return location of another vehicle 10 when the owner's vehicle 10 is absent (referred to as "owner-providing shared parking station", below).

Specifically, the car-sharing management server 30 receives a use reservation for a vehicle 10 from a mobile terminal 20 through a predetermined communication network, which may include, for example, a mobile communication network having base stations at the ends, a satellite communication network using a communication satellite, and the Internet. Also, the car-sharing management server 30 receives a registration of a provision schedule of the vehicle 10 from a mobile terminal 20A to the C2C car-sharing (e.g., a period during which the vehicle 10 can be provided for the C2C car-sharing, etc., referred to as the "vehicle provision schedule", below). Then, the car-sharing management server 30 updates information on the use schedule of the vehicle 10 (referred to as "vehicle schedule information", below) and information on the use schedule of the parking station (referred to as "parking station schedule information", below).

Also, the car-sharing management server 30 manages authentication keys for the users to use the vehicles 10, for example, in the C2C car-sharing. Specifically, the car-sharing management server 30 is communicably connected with the vehicle management server 40 through a predetermined communication network, which may include, for example, the Internet network and the like, and in response to a use reservation for a vehicle 10 to be registered in the vehicle schedule information, requests the vehicle management server 40 to issue an authentication key. Then, the car-sharing management server 30 receives the authentication key from the vehicle management server 40 and delivers the received authentication key to the mobile terminal 20 of the user corresponding to the use reservation for the vehicle 10.

Outline of Vehicle Management Server

The vehicle management server 40 manages the vehicles 10.

The vehicle management server 40 is communicably connected with the vehicles 10 through a predetermined communication network, which may include, for example, a mobile communication network having base stations at the ends, a satellite communication network using a communication satellite, and the Internet, to exchange various signals with the vehicles 10 as described above. Thereby, the vehicle management server 40 can transmit various commands to vehicles 10, receive information on various states and the like from the vehicles 10, to manage the multiple vehicles 10.

Also, in response to a request received from the car-sharing management server 30 through a predetermined communication network, which may include, for example, the Internet network and the like, the vehicle management server 40 issues a time-limited authentication key (e.g., an authentication key valid only for a predetermined valid period from the start date and time to the end date and time specified in a use reservation added with a predetermined buffer period). The vehicle management server 40 transmits the issued authentication key to the car-sharing management server 30 and the vehicle 10 corresponding to the authentication key. Thereby, the vehicle 10 (specifically, the key unit 12 as will be described later) can receive the authentication key, and during the valid period of the authentication key, can allow the user to use the vehicle 10 based on the authentication key.

Configuration of Car-Sharing System

Next, with reference to FIG. 2 in addition to FIG. 1, a configuration of the car-sharing system 1 according to the present embodiment will be described in detail.

Figure 2:
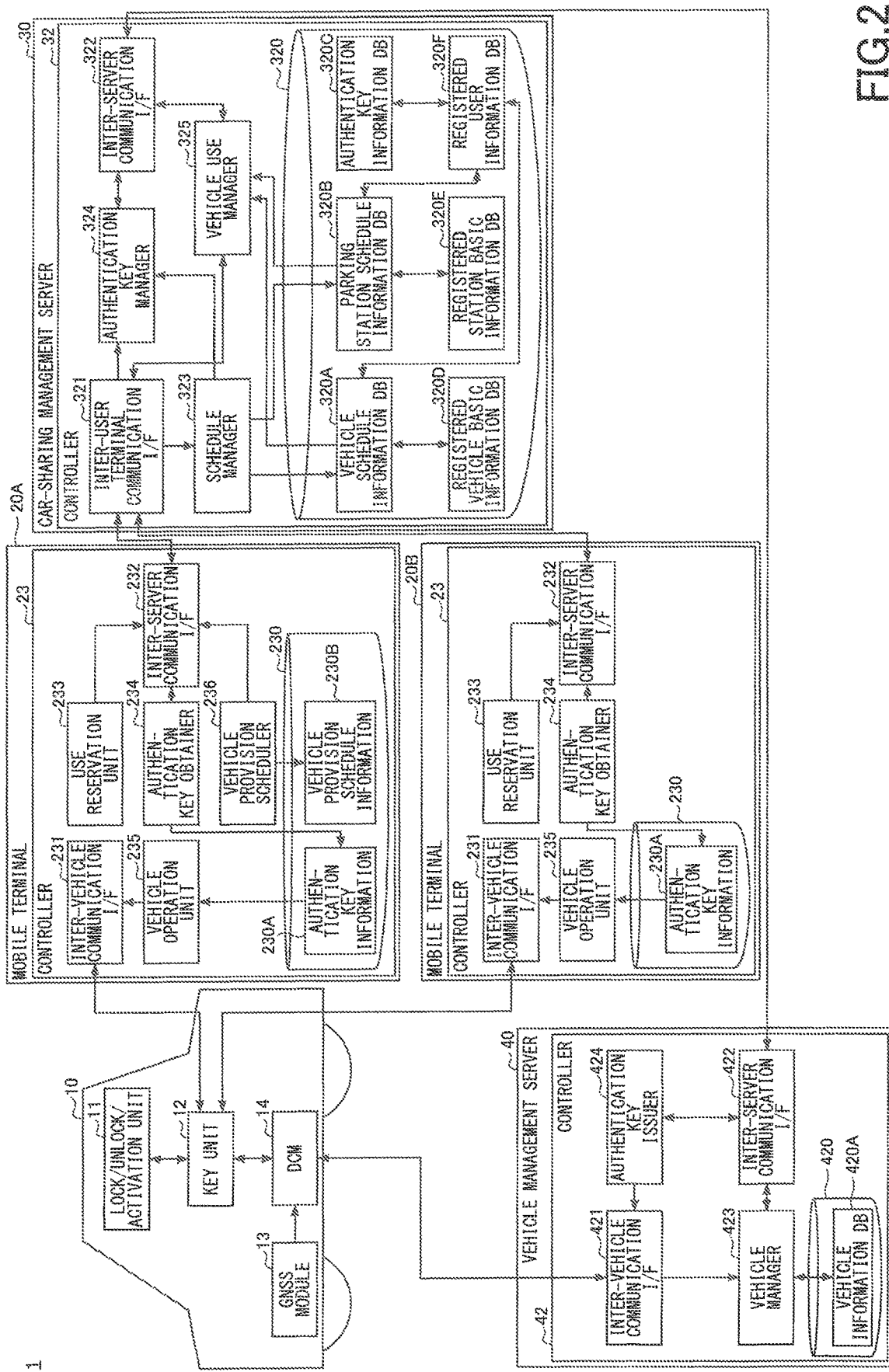
FIG. 2 is a functional block diagram illustrating an example of a car-sharing system.

FIG. 2 is a functional block diagram illustrating a functional configuration of an example of a car-sharing system (car-sharing system 1) according to the present embodiment.

Configuration of Vehicle

The vehicle 10 includes a lock/unlock/activation unit 11, a key unit 12, a GNSS (Global Navigation Satellite System) module 13, and a DCM (Data Communication Module) 14.

The lock/unlock/activation unit 11 is attached to the vehicle 10, to lock or unlock a door of the vehicle 10 or to activate the vehicle 10 based on signals exchanged with the key unit 12. Activation of the vehicle 10 includes starting an engine 117, which will be described later, in the case of the vehicle 10 using the engine 117 as the main power source; turning on the power of an electric motor in the case of the vehicle 10 capable of traveling by the power of the electric motor (e.g., turning on a switch on a power path between the electric motor for driving and a battery as the power supply); and activating an ECU (Electronic Control Unit) performing integrated control of the vehicle 10. In the following, in the present embodiment, the description assumes that activation of the vehicle 10 means starting the engine 117. Specifically, the lock/unlock/activation unit 11 locks and unlocks a door of the vehicle 10 in response to a lock signal and an unlock signal transmitted from the key unit 12 as a radio wave in an RF (Radio Frequency) band (e.g., 300 MHz to 3 GHz) (referred to as the "RF radio wave", below). Also, the lock/unlock/activation unit 11 activates the vehicle 10, triggered by a pressing operation on an activation switch (not illustrated) provided in the interior of the vehicle 10, and depending on an exchange with the key unit in a radio wave in an LF (Low Frequency) band (e.g., 30 Hz to 300 kHz) (referred to as the "LF radio wave", below) and an RF wave. The lock/unlock/activation unit 11 includes an LF radio transmitter 111, an RF radio receiver 112, a verification ECU 113, a body ECU 114, door lock motors 115, an engine ECU 116, and the engine 117 as the drive power source of the vehicle 10.

Note that the lock/unlock/activation unit 11 operates on electric power supplied from an auxiliary battery (not illustrated) installed in the vehicle 10.

The LF radio wave transmitter 111 is built in, for example, the center console or the door handle in the vehicle interior, to transmit an LF radio wave under control of the verification ECU 113.

The RF wave receiver 112 is provided in, for example, a trim of the trunk of the vehicle 10, to receive an RF radio wave under control of the verification ECU 113.

The verification ECU 113 is an electronic control unit that controls locking/unlocking the door(s) of the vehicle 10 and activating the vehicle 10, based on an exchange of signals with the key unit 12. The verification ECU 113 may be implemented discretionarily by hardware, software, or a combination of these. The verification ECU 113 may be mainly constituted with, for example, a microcomputer that includes a CPU (Central Processing Unit), a RAM (Random Access Memory), a ROM (Read-Only Memory), a non-volatile auxiliary storage device, an RTC (Real Time Clock), and a communication interface. Here, the verification ECU 113 implements various control processes by running various programs stored, for example, in the ROM and the non-volatile auxiliary storage device on the CPU. In the following, the same applies to a key ECU 124, which will be described later.

The verification ECU 113 receives an unlocking signal and a locking signal transmitted as RF radio waves from the key unit 12, through the RF radio receiver 112.

Also, in the case of receiving an unlock signal or a lock signal, the verification ECU 113 authenticates the transmission source of the unlock signal or the lock signal (key unit 12), based on key information included in the unlock signal or the lock signal (referred to as "internal key information", below). For example, if internal key information registered in advance in an internal memory such as the auxiliary storage device matches the internal key information included in the unlock signal or the lock signal, the verification ECU 113 determines that the authentication is successful; or otherwise, determines that the authentication has failed.

Also, for example, the verification ECU 113 may perform a challenge and response authentication, by transmitting through the LF radio wave transmitter 111 an LF radio wave including a "challenge" generated by a predetermined method using the internal key information in the internal memory, toward the key unit 12, and receiving through the receiver 112 a "response" replied from the key unit 12, on which the authentication can be based.

Then, if the authentication is successful, the verification ECU 113 transmits an unlock command (upon reception of an unlock signal) or a lock command (upon reception of a lock signal) to the body ECU 114 through an in-vehicle network such as a CAN (Controller Area Network).

Also, after having transmitted an unlock command or a lock command to the body ECU 114, if receiving a reply indicating that the door is normally unlocked or locked from the body ECU 114 through the in-vehicle network such as a CAN (an unlock reply or a lock reply), the verification ECU 113 transmits through the LF radio transmitter 111 a notice to the key unit 12 indicating that the door has been unlocked or locked (an unlock notice or a lock notice).

Note that in an unlock signal, only some of the doors of the vehicle 10 may be designated as targets to be unlocked. In such a case, the verification ECU 113 specifies the doors to be unlocked in the unlock command. This causes the body ECU 114 to actuate only the door lock motors 115 corresponding to the specified doors, and hence, enables to have only the specified doors unlocked.

Also, in the case where a press operation is performed on the activation switch described above, the verification ECU 113 authenticates the key unit 12 by exchanging signals with the key unit 12 through the LF radio wave transmitter 111 and the RF radio wave receiver 112.

For example, the verification ECU 113 transmits a request signal in the LF band requesting a reply of the internal key information, from the LF radio wave transmitter 111 to the key unit 12. Then, when a response signal including the internal key information has been received from the key unit 12 by the RF wave receiver 112, the verification ECU 113 determines whether the authentication is successful or has failed based on a match between the internal key information registered in advance in the internal memory and the internal key information included in the response signal, as in the case of locking/unlocking the doors.

Also, for example, the verification ECU 113 may perform a challenge and response authentication as in the case of locking/unlocking the doors.

Then, if the authentication is successful, the verification ECU 113 transmits a start command of the engine 117 to the engine ECU 116 through the in-vehicle network such as a CAN.

The body ECU 114 is an electronic control unit to control operations of a door lock motor 115 that is communicably connected through a one-to-one communication line or the like. In response to an unlock command from the verification ECU 113, the body ECU 114 outputs a control command to cause the door lock motor 115 to perform an unlock operation. Also, in response to a lock command from the verification ECU 113, the body ECU 114 outputs a control command to cause the door lock motor 115 to perform a lock operation. Also, once the door has normally been unlocked or locked by the control command output to the door lock motor 115, the body ECU 114 transmits an unlock reply or a lock reply to the verification ECU 113 through the in-vehicle network such as a CAN.

The door lock motor 115 is a known electric actuator that unlocks and locks the door(s) of the vehicle 10 in response to a control command from the body ECU 114.

The engine ECU 116 is an electronic control unit that drives and controls the engine 117. Specifically, the engine ECU 116 drives and controls various actuators such as a starter and an injector, which are installed in the engine 117. When a start command is input from the verification ECU 113, the engine ECU 116 outputs a control command to various actuators such as a starter and an injector of the engine 117, to start the engine 117.

The key unit 12 performs an authentication process based on the authentication key received from the mobile terminal 20, and if the authentication is successful, allows the user who possesses the mobile terminal 20 to perform various operations of the vehicle 10 (e.g., unlocking, locking, activation, etc. of the vehicle 10). Specifically, if the authentication is successful, the key unit 12 transmits and receives signals with the lock/unlock/activation unit 11 to cause the lock/unlock/activation unit 11 to transition into a state where the door(s) of the vehicle 10 can be locked and unlocked and the vehicle 10 can be activated in response to an operation performed by the user on the mobile terminal 20 or the vehicle 10. More specifically, the key unit 12 is placed in the interior of the vehicle 10, to transmit an unlock signal and a lock signal as RF waves to the lock/unlock/activation unit 11 in response to an unlock request and a lock request, respectively, transmitted from the mobile terminal 20. Also, when a press operation is performed on the activation switch provided in the interior of the vehicle 10, the key unit 12 exchanges signals with the lock/unlock/activation unit 11 in response to signals in the LF band transmitted from the lock/unlock/activation unit 11. The key unit 12 includes an LF radio wave receiver 121, an RF radio wave transmitter 122, a communicator 123, and a key ECU 124.

The key unit 12 may be placed at a position that is difficult to visually recognize for a user seated on any of the seats of the vehicle 10 (e.g., the interior of a glove box or a center console box, etc.). Also, the key unit 12 may be fixed or may not be fixed to the vehicle 10. Also, the key unit 12 may be operated on a built-in button battery or the like, or may be operated on electric power supplied from an auxiliary battery installed in the vehicle 10.

The LF radio wave receiver 121 receives an LF radio wave from the outside under control of the key ECU 124.

The RF radio wave transmitter 122 transmits an RF radio wave to the outside under control of the key ECU 124.

The communicator 123 is a device to perform short-range communication in a predetermined method with the mobile terminal 20 under control of the key ECU 124. The communicator 123 may be, for example, a BLE communication module to communicate with the mobile terminal 20 according to the BLE communication standard. Also, the following description assumes that the communication standard adopted by the communicator 123 is compliant with the BLE communication.

Note that the communicator 123 may be a communication device compliant with a communication standard targeting a very short communicable range, for example, an NFC (Near Field Communication) standard or the like. In this case, the communicator 123 may be built in a position close to the body surface of the vehicle 10 outside the vehicle interior (e.g., the inside of a door handle) or the like. This enables the key unit 12 (the key ECU 124) to communicate with the mobile terminal 20 outside the vehicle interior even if the communicator 123 has a very short communicable range.

The key ECU 124 is an electronic control unit that controls transmission of a lock signal and an unlock signal to the lock/unlock/activation unit 11 in response to a lock request and an unlock request received from the mobile terminal 20.

The key ECU 124 controls the communicator 123 to establish a state in which communication with the mobile terminal 20 is enabled based on a predetermined communication standard, for example, the BLE communication standard.

Specifically, the key ECU 124 periodically (e.g., every several seconds) transmits an advertising packet including advertisement information within a predetermined reachable communication range (e.g., several meters to several tens of meters) from the communicator 123. The advertisement information includes a UUID (Universally Unique Identifier), a device ID (Identifier), and the like that correspond to the key unit 12. This enables the mobile terminal 20 to receive the advertising packet to confirm the advertisement information, so as to identify the key unit 12 installed in the target vehicle 10.

In response to receiving a connection request by BLE communication from the mobile terminal 20 located within the communication range of the vehicle 10 (the key unit 12) that has received the advertising packet, the key ECU 124 establishes a state in which communication with the mobile terminal 20 is enabled by BLE communication. At this time, the key ECU 124 transmits a connection response to the mobile terminal 20 indicating that a state has been established in which BLE communication is enabled by BLE communication, through the communicator 123.

Also, in the state described above in which the BLE communication has been established, the key ECU 124 receives an authentication request including the authentication key associated with the key unit 12 from the mobile terminal 20 through the communicator 123.

Also, upon receiving the authentication request including the authentication key associated with the key unit 12 from the mobile terminal 20, the key ECU 124 authenticates the mobile terminal 20 based on the authentication key. Once the authentication is successful, the key ECU 124 restores the internal key information stored in the internal memory of the auxiliary storage device or the like to a usable state. The internal key information is stored in a state not usable for authentication in the lock/unlock/activation unit 11, for example, in an inaccessible state, in an encrypted state, or the like. Therefore, once the authentication of the mobile terminal 20 is successful the key ECU 124 changes the access permission of the internal memory for changing the internal key information into an accessible state, or based on the authentication key, decrypts the encrypted internal key information. This enables the key ECU 124 to access the internal key information that is not normally accessible so as to transmit an unlock signal or a lock signal including the internal key information to the lock/unlock/activation unit 11, and to decrypt the encrypted internal key information based on the authentication key. Thus, the lock/unlock/activation unit 11 can perform appropriate authentication based on the internal key information included in the unlock signal and the lock signal. Also, even if a malicious third party illegally obtains the key unit 12, the internal key information in the key unit 12 is inaccessible or encrypted, and hence, it is possible to prevent theft of the vehicle 10.

In the state described above in which the BLE communication has been established, the key ECU 124 also receives an unlock request and a lock request from the mobile terminal 20 through the communicator 123. Once the authentication of the mobile terminal 20 is successful (specifically, the authentication of the mobile terminal 20 is successful, and thereafter, the state of the established BLE communication continues), and if receiving an unlock request or a lock request from the mobile terminal 20, the key ECU 124 transmits an unlock signal or a lock signal including the internal key information to the lock/unlock/activation unit 11 through the RF radio wave transmitter 122.

Thus, after the authentication process in the lock/unlock/activation unit 11 described above, locking or unlocking the door(s) of the vehicle 10 is realized.

Also, after having transmitted an unlock signal to the lock/unlock/activation unit 11, if receiving an unlock notice from the lock/unlock/activation unit 11 through the LF radio wave receiver 121, the key ECU 124 transmits an unlock completion notice to the mobile terminal 20 with which the BLE communication has been established, namely, the mobile terminal 20 as the transmission source of the unlock request, through the communicator 123. Similarly, after having transmitted a lock signal to the lock/unlock/activation unit 11, if receiving a lock notice from the lock/unlock/activation unit 11 through the LF radio wave receiver 121, the key ECU 124 transmits a lock completion notice to the mobile terminal 20 with which the BLE communication has been established, through the communicator 123. This enables the mobile terminal 20 as the transmission source of the lock request or the unlock request based on a predetermined operation performed by the user, to confirm that the locking/unlocking of the vehicle 10 has been completed normally. Therefore, when an unlocking completion notice or a locking completion notice is received, with the content of the notice being displayed on the mobile terminal 20 (a display 25, which will be described later), the user can confirm that the locking/unlocking of the vehicle 10 has been completed normally.

Also, as described above, when the activation switch provided in the interior of the vehicle 10 is pressed, in response to a signal in the LF band transmitted from the lock/unlock/activation unit 11, the key ECU 124 exchanges signals with the lock/unlock/activation unit 11.

For example, when a request signal described above has been received from the lock/unlock/activation unit 11 by the LF radio wave receiver 121, the key ECU 124 transmits a response signal including the internal key information stored in the internal memory or the like to the lock/unlock/activation unit 11, through the RF radio wave transmitter 122.

Also, for example, when an LF radio wave including a "challenge" is received from the lock/unlock/activation unit 11 by the LF radio wave receiver 121, the key ECU 124 generates a "response" based on the internal key information and transmits the "response" to the lock/unlock/activation unit 11 through the RF radio wave transmitter 122.

Thus, after the authentication process described above in the lock/unlock/activation unit 11, the start of the engine 117 is realized (namely, the vehicle 10 is activated).

The GNSS module 13 determines the position (with respect to e.g., latitude, longitude, altitude, etc.) of a device in which it is installed, namely, the vehicle 10, based on signals received from three or more (preferably four or more) artificial satellites above the GNSS module 13. In the following, the same applies to a GNSS module 24 of the mobile terminal 20, which will be described later. The GNSS module 13 is communicably connected with the DCM 14 or the like through a one-to-one communication line or an in-vehicle network such as CAN, and the measured positional information on the vehicle 10 is taken into the DCM 14 or the like.

The DCM 14 bidirectionally communicates with the vehicle management server 40 through a predetermined communication network, which may include, for example, a mobile communication network having base stations at the ends, a satellite communication network using a communication satellite, and the Internet. For example, the DCM 14 transmits information on the state of the vehicle 10 (e.g., information detected by various sensors) and the surrounding state of the vehicle 10 (e.g., surrounding images captured by a camera installed in the vehicle 10), including the positional information on the vehicle 10 input from the GNSS module 13 (referred to as the "vehicle information, below) to the vehicle management server 40.

Configuration of Mobile Terminal

The mobile terminal 20 includes a communicator 21, a communicator 22, a controller 23, a GNSS module 24, and a touch panel display (simply referred to as the "display", below) 25.

The communicator 21 is a device to perform short-range communication with the vehicle 10 (the key unit 12) according to the same communication standard as that of the communicator 123 of the vehicle 10. As described above, in the present embodiment, the communicator 21 is, for example, a BLE communication module.

The communicator 22 is a device to communicate with the car-sharing management server 30 and the like through a predetermined communication network. The communicator 22 is a mobile communication module corresponding to a communication standard such as LTE (Long Term Evolution), 4G (Fourth Generation), 5G (Fifth Generation), or the like.

The controller 23 performs various control processes in the mobile terminal 20. The functions of the controller 23 may be implemented discretionarily by hardware, software, or a combination of these, which may include, for example, a CPU, a RAM, a ROM, a non-volatile auxiliary storage device, an RTC, and various interfaces for communication. As functional units implemented by executing one or more programs stored in the ROM or the non-volatile auxiliary storage device on the CPU, the controller 23 includes, for example, an inter-vehicle communication interface (referred to as the "inter-vehicle communication IF", below) 231, an inter-server communication interface (referred to as the "inter-server communication IF", below) 232, a reservation unit 233, an authentication key obtainer 234, and a vehicle operation unit 235. Also, as a functional unit specific to the mobile terminal 20A of a vehicle providing user, the controller 23 includes a vehicle provision scheduler 236. The controller 23 also includes, for example, a storage 230 specified as a storage area in the non-volatile auxiliary storage device, and a process of holding (storing) various data items in the storage 230 is implemented by a predetermined program stored in the ROM or the auxiliary storage device. The inter-vehicle communication IF 231, the inter-server communication IF 232, the reservation unit 233, the authentication key obtainer 234, the vehicle operation unit 235, and the vehicle provision scheduler 236 may have their functions enabled (usable by the user), for example, when a predetermined application installed in advance in the mobile terminal 20 (referred to as the "car-sharing application", below) is activated.

The GNSS module 24 determines the position of the mobile terminal 20. The positional information obtained by the GNSS module 24 (positional information on the mobile terminal 20) is taken into the controller 23.

Note that the mobile terminal 20 may determine the position of the mobile terminal 20 by base station positioning based on wireless communication with multiple base stations.

The display 25 is, for example, a liquid crystal display or an organic EL (Electroluminescent) display, and is a display device that is provided on the front surface of the mobile terminal 20, and also serves as an operation unit of a known type of touch panel.

The inter-vehicle communication IF 231 uses the communicator 21 to perform bidirectional short-range communication (in the present embodiment, BLE communication) of a predetermined method with the vehicle 10, specifically, with the key unit 12, so as to transmit and receive various signals. The vehicle operation unit 235 exchanges signals with the vehicle 10 (the key unit 12) through the inter-vehicle communication IF 231.

The inter-server communication IF 232 uses the communicator 22 to connect to a predetermined communication network so as to transmit and receive various signals including data signals and control signals with the car-sharing management server 30 bi-directionally. The reservation unit 233, the authentication key obtainer 234, the vehicle provision scheduler 236, and the like exchange signals with the car-sharing management server 30 through the inter-server communication IF 232.

The reservation unit 233 makes a use reservation for a vehicle 10, for example, in response to an operation performed by a user on a predetermined GUI (Graphical User Interface) displayed on the display 25.

The reservation unit 233 displays, for example, an operation screen (application screen) relating to a car-sharing application as a GUI, specifically, an application screen for a use reservation of a vehicle 10 (referred to as the "use reservation screen", below) on the display 25. The user selects (inputs) desired conditions for the vehicle 10 that the user wants to use through the touch panel or the like on the use reservation screen. The desired conditions include a departure location and a destination location, desired specifications of the vehicle 10 (e.g., the type of the vehicle such as sedan, station wagon, one box, SUV (Sports Utility Vehicle), etc., and a riding capacity), and a desired use period (start date and time of the use, and end date and time of the use). According to the desired conditions input or selected by an operation performed by the user through the touch panel or the like, the reservation unit 233 transmits a signal including the desired conditions to the car-sharing management server 30 (reservation candidate obtainment request) that requests information on vehicles 10 suitable as candidates for the use reservation, and parking stations suitable as candidates for the return location of the vehicles 10. Thereby, the reservation unit 233 can obtain (receive) information on the candidate vehicles 10 meeting the user's requirements and information on the candidate parking stations as the return location from the car-sharing management server 30.

Based on the information obtained from the car-sharing management server 30, the reservation unit 233 displays information on the candidate vehicles 10 and the candidate parking stations as the return location on the use reservation screen on the display 25. Thereby, the user can select a vehicle 10 to be used by himself/herself or a parking station to be used as the return location on the use reservation screen through a touch panel or the like.

The reservation unit 233 transmits a signal requesting a use reservation (referred to as "use reservation request", below) for a vehicle 10 and a parking station as the return location including the vehicle 10 selected by an operation performed by the user through a touch panel or the like, to the car-sharing management server 30. Thereby, a use reservation for the vehicle 10 and the parking station as the return location that meets the user's desired conditions is registered in the car-sharing management server 30.

Figure 3:
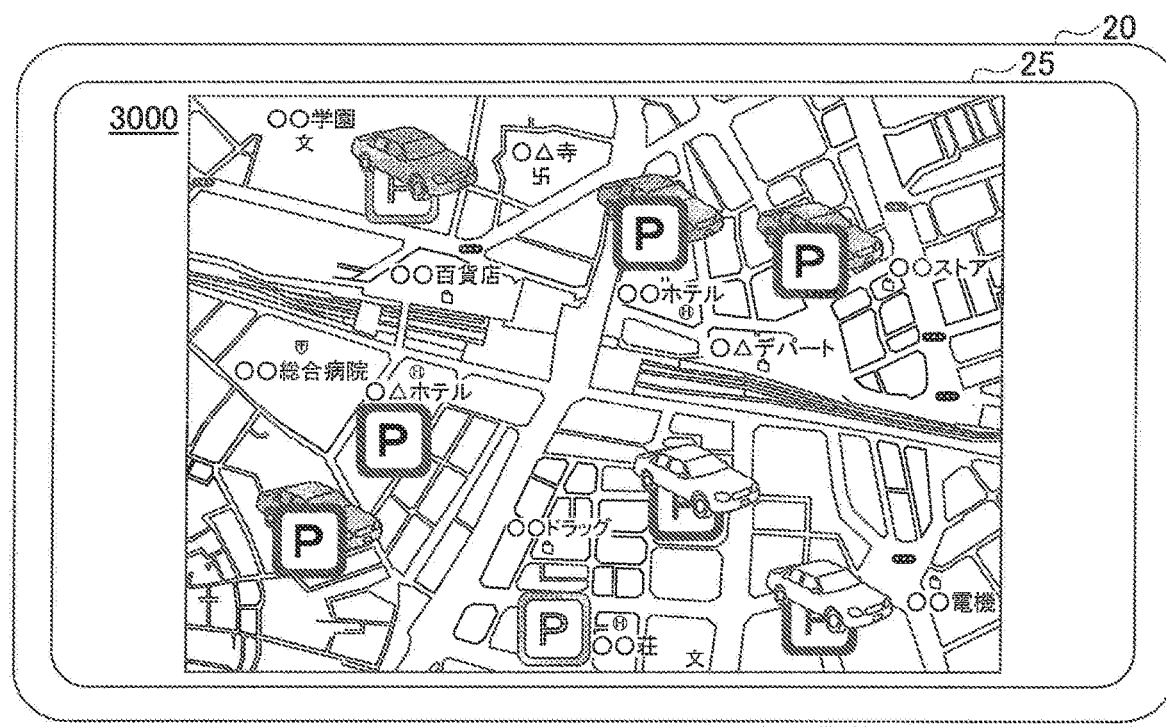
FIG. 3 is a diagram illustrating an example of a use reservation screen.

For example, FIG. 3 illustrates an example of a use reservation screen (use reservation screen 3000) displayed on the display 25 of the mobile terminal 20. Specifically, the use reservation screen 3000 presents an operation screen for selecting a vehicle 10 to be used (referred to as the "vehicle selection screen", below), or an operation screen for selecting a parking station for returning the vehicle selected on the vehicle selection screen (referred to as the "return location selection screen", below).

As illustrated in FIG. 3, the use reservation screen 3000 includes a map image around a departure location or a destination location input to be set in advance by the user through a touch panel or the like, on which icons 3001 to 3005 are superimposed to be displayed. The geographical range included in the map image on the use reservation screen 3000, namely, the geographical range of the positions of vehicles 10 and parking stations that can be extracted as candidates by the car-sharing management server 30 may be, for example, an area within a predetermined distance (e.g., several hundreds of meters) from the departure location or the destination location that have been input to be set, or may be a predetermined subarea among multiple subareas divided in advance in the service providing area, which includes the departure location or the destination location that have been input to be set.

An icon 3001 represents an available vehicle 10 during the desired use period input to be set by the user and a parking station (an owner providing station or a company providing station) at which the vehicle 10 is parked.

An icon 3002 represents an owner providing station at which the vehicle 10 can be returned (namely, a vehicle 10 whose home location is the owner providing station is not parked) during the desired use period input to be set by the user.

An icon 3003 represents a vehicle 10 that is unavailable due to, for example, out-of-service hours, and a parking station (an owner providing stations or a company providing stations) at which the vehicle 10 is parked and another vehicle 10 cannot be returned during the desired use period input to be set by the user.

An icon 3004 represents a company providing station at which a vehicle 10 can be returned during the desired use period input to be set by the user.

An icon 3005 represents a company providing station at which a vehicle 10 cannot be returned (e.g., a vehicle cannot be parked due to the lock hours) during the desired use period input to be set by the user.

The reservation unit 233 superimposes one of the icons 3001 to 3005 at a position corresponding to a place where each parking station is arranged on the map image of the use reservation screen 3000, and displays the icons. At this time, based on the departure location, the destination location, the desired use period (the desired use start date and time and use end date and time) input to be set by the user, the reservation unit 233 transmits a query about the state of each parking station in the vicinity of the departure location or in the vicinity of the destination location (icon 3001 To 3005) to the car-sharing management server 30 (namely, transmits a reservation candidate obtainment request). Thereby, the reservation unit 233 can display the use reservation screen 3000 on the display 25 based on a reply to the query from the car-sharing management server 30. The user can select a vehicle 10 by, for example, performing a touch operation at the position corresponding to one of the icons 3001 on the display 25 on the use reservation screen 3000 corresponding to the vehicle selection screen. Also, for example, on the use reservation screen 3000 corresponding to the return location selection screen, the user can select a parking station as the return location of the vehicle 10 by touching the position corresponding to an icon 3002 or an icon 3004 on the display 25.

Note that the reservation unit 233 does not need to display all types of icons 3001 to 3005 on the use reservation screen 3000 on the display 25. For example, when the use reservation screen 3000 corresponds to the vehicle selection screen, the reservation unit 233 may display at least the icon(s) 3001 from among the icons 3001 to 3005 on the map image of the use reservation screen 3000. Also, for example, when the use reservation screen 3000 corresponds to a return location selection screen, the reservation unit 233 may display at least the icons 3002 and 3004 from among the icons 3001 to 3005 on the map image of the use reservation screen 3000. Also, a use reservation for a vehicle 10 may be made on a user terminal other than the mobile terminal 20 (e.g., a laptop or desktop computer terminal at home of the user of the mobile terminal 20, or on a dedicated terminal for use reservation at a sales office or the like of the company providing the C2C car-sharing service).

Referring back to FIG. 1 and FIG. 2, the authentication key obtainer 234 obtains an authentication key of the vehicle 10 whose use reservation is confirmed (namely, registered in the car-sharing management server 30) by the reservation unit 233 from the car-sharing management server 30. For example, the authentication key obtainer 234 obtains authentication key information including an authentication key automatically delivered from the car-sharing management server 30 in response to a confirmation of the use reservation by the reservation unit 233. Also, in response to a user operation on a predetermined GUI displayed on the display 25, the authentication key obtainer 234 transmits an authentication key attainment request to the car-sharing management server 30, to obtain the authentication key information to be replied from the management server 30 in response to the authentication key obtainment request. The authentication key obtainer 234 saves the obtained authentication key information in the storage 230 (authentication key information 230A).

Note that, as a matter of course, the controller 23 of a mobile terminal 20A of a vehicle providing user holds an authentication key of a vehicle 10 owned by the vehicle providing user (referred to as an "owned vehicle", below) in a non-volatile internal memory such as an auxiliary storage device or the like, to be separated from an authentication key of a vehicle 10 subject of a use reservation through the reservation unit 233, namely, a vehicle 10 other than the vehicle 10 owned by the vehicle providing user. Also, the controller 23 of a mobile terminal 20 of an associate vehicle providing user holds the authentication key of the corresponding owned vehicle in a non-volatile internal memory such as an auxiliary storage device, at least when using the vehicle. In this case, under permission of the vehicle providing user through a user terminal such as the mobile terminal 20A, the vehicle management server 40 may deliver an authentication key of the corresponding providing vehicle (specifically, an authentication key with a limited period of use) to the mobile terminal 20 of the associate vehicle providing user.

In response to an operation performed by the user (an operation on the mobile terminal 20 or an operation on the vehicle 10), the vehicle operation unit 235 exchanges signals with the vehicle 10 (the key unit 12), to enable locking, unlocking, activation, and the like of the vehicle 10. Specifically, the vehicle operation unit 235 transmits to the vehicle 10 an authentication key corresponding to the vehicle 10 (the key unit 12) in a state where the mobile terminal 20 can communicate with the vehicle 10 (the key unit 12) by short-range communication of a predetermined method. Thereby, after the above-described authentication process in the key unit 12 (the key ECU 124), a state is realized in which it is possible to lock/unlock the door(s) of the vehicle 10, to activate the vehicle 10, etc., in response to an operation on the mobile terminal 20 or an operation on the vehicle 10 performed by the user.

Also, upon receiving from the vehicle 10 (the key unit 12) a notice (referred to as a "locking/unlocking-function-on notice", below) indicating that the vehicle 10 is in a state of capable of locking and unlocking the vehicle 10 (a state of the locking and unlocking functions being turned on), the operation unit 235 displays an operation screen on the display 25 for the user to perform a locking operation or an unlocking operation of the vehicle 10 (referred to as an "locking/unlocking operation screen", below). Then, when the user performs an unlocking operation or a locking operation (e.g., a touch operation on a button icon for an unlocking operation or a locking operation) on the locking/unlocking operation screen through a touch panel or the like, the vehicle operation unit 235 transmits an unlocking request or a locking request to the vehicle 10 (the key unit 12). Thereby, after the authentication process in the key unit 12 and the lock/unlock/activation unit 11 has been performed as described above, unlocking or locking of the vehicle 10 is realized.

In response to an operation performed by a vehicle providing user on a GUI on the display 25, the vehicle provision scheduler 236 registers a vehicle provision schedule that includes a period during which a vehicle 10 (providing vehicle) owned by the vehicle providing user is provided to be shared to be used by the multiple users of the C2C car-sharing (referred to as "car-sharing provision period", below), and an owner use period. For example, the vehicle provision scheduler 236 may receive registration settings on the vehicle provision schedule for periods of a fixed length (e.g., every two weeks or every month) in advance (e.g., several weeks to several days before the fixed-length periods). For example, the vehicle provision scheduler 236 displays on the display 25 an operation screen (vehicle provision schedule setting screen) on which a car-sharing provision period can be set. The user can set a car-sharing provision period of a vehicle 10 within a period of the fixed length on the vehicle provision schedule setting screen. In this case, the vehicle provision scheduler 236 can recognize a period other than the car-sharing provision period as an owner use period. Conversely, the vehicle provision scheduler 236 may allow the vehicle providing user to set and register an owner use period for each period of the fixed length on the vehicle provision schedule setting screen. In this case, the vehicle provision scheduler 236 can recognize a period other than the owner use period in the period of the fixed length as a car-sharing provision period. In accordance with new contents input to be set by the user on the vehicle provision schedule setting screen, the vehicle provision scheduler 236 updates information on the vehicle provision schedule stored in the storage 230 (the vehicle provision schedule information 230B). Then, every time the vehicle provision schedule information 230B is updated, the vehicle provision scheduler 236 transmits to the car-sharing management server 30 the updated vehicle provision schedule information 230B or difference data corresponding to the updated portion of the vehicle provision schedule information 230B. Thereby, every time the vehicle provision schedule information 230B is updated, the vehicle schedule information of the corresponding vehicle 10 (the vehicle schedule information DB 320A, which will be described later) can be updated in the car-sharing management server 30.

At this time, owner use periods may include, in addition to a period during which the vehicle providing user uses the vehicle 10 (providing vehicle) by himself/herself, a period during which a person connected with the vehicle providing user, namely, an associate vehicle providing user uses the corresponding providing vehicle. This is because a person closely connected with the vehicle providing user may have a right to use the vehicle 10 owned by the vehicle providing user on the basis of an implicit consent or a specific arrangement among the parties. Therefore, in the vehicle provision schedule information 230B in the storage 230, each owner use period may be registered in a form of designating a specific user (the vehicle providing user or a specific associate vehicle providing user), or in a form classified as a use period of the vehicle providing user or as a use period of an associate vehicle providing user. Thereby, the car-sharing management server 30 (the controller 23) can recognize the users for the respective owner use periods.

Note that a period to be used by an associate vehicle providing user among the owner use periods may be set to be registered from the mobile terminal 20 of the associate vehicle providing user, for example, under permission of the vehicle providing user through a user terminal such as the mobile terminal 20A. In this case, the mobile terminal 20 (the controller 23) of the vehicle providing user may include substantially the same functions as those in the vehicle provision scheduler 236, as in the mobile terminal 20A. Also, a registration setting of a car-sharing provision period or an owner use period of the vehicle 10 may be performed on a user terminal other than the mobile terminal 20A (e.g., a laptop type or desktop type computer terminal used by a vehicle providing user at home or a dedicated terminal at a sales office or the like of the company providing the C2C car-sharing service).

Configuration of Car-Sharing Management Server

The car-sharing management server 30 includes a communicator 31 and a controller 32.

The communicator 31 is a device for bidirectionally communicating with external devices such as the mobile terminal 20 and the vehicle management server 40 through a predetermined communication network.

The controller 32 performs various control processes in the car-sharing management server 30. The controller 32 may be configured with one or more server computers each of which includes, for example, a CPU, a RAM, a ROM, a non-volatile auxiliary storage device, an RTC, various interfaces for communication, and the like. The same applies to the controller 42, which will be described later, of the vehicle management server 40. The controller 32 includes, for example, an inter-user terminal communication interface (referred to as the "inter-user terminal communication IF", below) 321, an inter-server communication interface (referred to as the "inter-server communication IF", below) 322, a schedule manager 323, an authentication key manager 324, and a vehicle use monitoring unit 325, as functional units implemented by executing one or more programs stored in a ROM, a non-volatile auxiliary storage device or the like on a CPU. The controller 32 also includes, for example, a storage 320 as a storage area defined in a non-volatile auxiliary storage device, an external storage device connected with or a server computer, or the like.

In the storage 320 (a first storage and a second storage), a vehicle schedule information DB (Database) 320A, a parking station schedule information DB 320B, an authentication key information DB 320C, a registered vehicle basic information DB 320D, a registered station basic information DB 320E, and a registered user information DB 320F are constructed.

The vehicle schedule information DB 320A stores information (vehicle schedule information) on the use schedule for each of the multiple vehicles 10 registered in the C2C car-sharing in a form that the information can be extracted for each vehicle 10. Also, the vehicle schedule information DB 320A is linked with the parking station schedule information DB 320B, to integrate information on the parking station at the departure location corresponding to a use reservation for a vehicle 10 and the parking station as the return location. The vehicle schedule information DB 320A is also linked with the registered vehicle basic information DB 320D, and is configured to be capable of extracting the vehicle schedule information with extraction conditions with respect to the basic information on each registered vehicle 10 (e.g., identification information such as a vehicle ID, vehicle type, riding capacity, manual transmission or automatic transmission, etc. of the vehicle 10, which will be referred to as the "registered vehicle basic information", below). The vehicle schedule information DB 320A is also linked with the registered user information DB 320F, and is configured to be capable of extracting, for example, vehicle schedule information including use reservations for each registered user.

The parking station schedule information DB 320B stores information (parking station schedule information) on use schedules for each of the multiple parking stations registered in the C2C car-sharing in a form that use schedules can be extracted for each parking station. The parking station schedule information DB 320B is also linked with the vehicle schedule information DB 320A, to integrate information on a parked vehicle 10 corresponding to a use schedule of a parking station. The parking station schedule information DB 320B is also linked with the registered station basic information DB 320E, and is configured to be capable of extracting parking station schedule information with extraction conditions with respect to the basic information for each of the multiple registered parking stations (e.g., identification information such as a station ID, positional information, type among owner-providing dedicated parking station/owner-providing shared parking station/ company providing station, etc., of each parking station, which will be referred to as the "registered station basic information", below). The parking station schedule information DB 320B is also linked with the registered user information DB 320F, and is configured to be capable of extracting, for example, parking station information including use reservations for parking stations for each registered user.

Note that the vehicle schedule information DB 320A and the parking station schedule information DB 320B may be integrated into a single database in which use reservations a vehicle 10 to be used and a parking station as the return location of the vehicle 10 can be integrally registered. In other words, the vehicle schedule information and the parking station schedule information may be stored in the same storage or may be stored in separate storages.

The authentication key information DB 320C stores authentication key information including an authentication key and its attached information obtained from the vehicle management server 40 (e.g., information for identifying the corresponding vehicle 10 (the key unit), identification information of the user such as a user ID corresponding to the mobile terminal 20 as the delivery destination, etc.). The authentication key information DB 320C is linked with the vehicle schedule information DB 320A, and is configured to be capable of extracting authentication key information with extraction conditions on a specific vehicle 10 and/or a use reservation of the specific vehicle 10, or the like. The authentication key information DB 320C is also linked with the registered user information DB 320F, and is configured to be capable of extracting, for example, authentication key information for each registered user.

The registered vehicle basic information DB 320D stores registered vehicle basic information for each of the multiple vehicles 10 registered in C2C car-sharing in a form that the information can be extracted for each vehicle 10.

The registered station basic information DB 320E stores registered station basic information for each of the multiple parking stations registered in the C2C car-sharing in a form that the information can be extracted for each parking station.

The registered user information DB 320F stores basic information for each of the multiple users registered in the C2C car-sharing in a form that the information can be extracted for each user (e.g., identification information such as user ID, name, address, type of the user such as vehicle provided user, associate vehicle providing user, or general user, owned vehicle in the case of a vehicle providing user or associate vehicle providing user, etc., which will be referred to as the "user information", below).

The inter-user terminal communication IF 321 transmits and receives various signals bidirectionally with a user terminal such as the mobile terminal 20 by using the communicator 31. The schedule manager 323 and the authentication key manager 324 and the like exchange signals with the mobile terminal 20 through the inter-user terminal communication IF 321.

The inter-server communication IF 322 transmits and receives various signals bidirectionally with the vehicle management server 40 by using the communicator 31. The authentication key manager 324 and the vehicle use monitoring unit 325 and the like exchange signals with the vehicle management server 40 through the inter-server communication IF 322.

The schedule manager 323 (an example of a reservation processor) manages the use schedule for each vehicle 10 and the use schedule for each parking station.

In response to a query (reservation candidate obtainment request) from a user terminal such as the mobile terminal 20, the schedule manager 323 replies with information on available vehicles 10 and returnable parking stations meeting the desired conditions (e.g., desired use period, departure location, destination location, vehicle type, number of occupants, etc.) to the user terminal. For example, based on the vehicle schedule information DB 320A and the parking station schedule information DB 320B, the schedule manager 323 extracts available vehicles 10 in the vicinity of the desired departure location, during the desired use period, meeting the desired vehicle type, the number of occupants, and the like; and a parking station at which the vehicle 10 is located. Also, based on the vehicle schedule information DB 320A and the parking station schedule information DB 320B, the schedule manager 323 may extract states of the other parking stations in the vicinity of the departure location (e.g., states corresponding to the icons 3002 to 3005 in FIG. 3 described above). Also, for example, based on the vehicle schedule information DB 320A and the parking station schedule information DB 320B, the schedule manager 323 extracts a parking station at which the vehicle 10 can be returned in the vicinity of the destination location as the desired condition within the desired use period. Also, based on the vehicle schedule information DB 320A and the parking station schedule information DB 320B, the schedule manager 323 may extract states of the other parking stations in the vicinity of the destination location (e.g., states corresponding to the icons 3001, 3003, and 3005 in FIG. 3 described above). Then, the schedule manager 323 replies with the information extracted from the vehicle schedule information DB 320A and the parking station schedule information DB 320B (the information on candidate vehicles 10 and candidate parking stations as the return location) based on the desired conditions, to the mobile terminal 20.

Note that the range of the return location for one-way use may be limited for each vehicle 10. This is because if the return location is too far from the home location of the vehicle 10, there is a likelihood that the vehicle 10 cannot be returned to its home location. This is also because, since the area of activity may differ for each vehicle providing user, a range that can be covered when picking up a one-way-use vehicle 10 along with an errand such as commuting may differ from one vehicle providing user to another. In this case, the range of the return location upon one-way use for each vehicle 10 may be defined according to contract conditions or the like between the company providing the C2C car-sharing and the vehicle providing user. Specifically, when extracting available vehicles 10 in the vicinity of a departure location during a desired use period, the schedule manager 323 may extract a vehicle 10 that has no restriction on the return location for one-way use, or a vehicle 10 whose restricted range for one-way use covers the destination location. Also, when extracting available vehicles 10 in the vicinity of a departure location during a desired use period, if a vehicle 10 is parked at a parking station that is not the home location, the schedule manager 323 may extract the vehicle 10 only if the destination location is in a direction approaching the home location. Also, when extracting available vehicles 10 in the vicinity of departure location during a desired use period, if a vehicle 10 is parked at a parking station that is not the home location, the schedule manager 323 may extract the vehicle 10 only if the destination location is within a predetermined distance (e.g., 5 km) from the home location. Thereby, when the vehicle 10 has come to a parking station other than the home location by one-way use, it is possible to avoid that the vehicle 10 goes to a place very far from the home location by repeated one-way use.

Also, in response to a use reservation request received from a user terminal such as the mobile terminal 20, the schedule manager 323 updates the vehicle schedule information DB 320A and the parking station schedule information DB 320B, based on the user ID, the vehicle ID, the parking station at the departure location, the parking station as the return location, the use period (the use start date and time, and the use end date and time) that can be identified in the use reservation request. Specifically, the schedule manager 323 additionally sets the use reservation for the vehicle 10 including the use period; the user ID; and the parking stations corresponding to the departure location and the destination location that can be identified in the use reservation request, in the vehicle schedule information on the vehicle 10 corresponding to the vehicle ID identified in the use reservation request. Also, the schedule manager 323 additionally sets the use reservation including the use period, the user ID, and the like identified in the use reservation request, in the parking station schedule information corresponding to the parking station as the return location identified in the use reservation request. Thereby, the use of the vehicle 10 during the use period by the user corresponding to the user terminal as the transmission source of the use reservation request is confirmed. Also, having a parking station corresponding to the departure location registered upon a use reservation, it is possible to manage operations of the vehicle 10 so as to prevent the vehicle 10 corresponding to the use reservation from going to another parking station due to one-way use. Also, having a parking station corresponding to the departure location registered upon a use reservation, it is possible to manage operations of the vehicle 10 and the parking station so as to prevent the parking station corresponding to the destination location from being used as the return location of another vehicle 10 before the use period.

Also, the schedule manager 323 updates the vehicle schedule information on the corresponding vehicle 10 in the vehicle schedule information DB 320A, based on the vehicle provision schedule information or the difference data corresponding to the updated portion received from a user terminal such as the mobile terminal 20. Specifically, the schedule manager 323 updates a car-sharing provision period and an owner use period during a new (future) period of a fixed length in the vehicle schedule information. Thereby, the schedule manager 323 can receive a use reservation for the vehicle 10 in the car-sharing provision period through the reservation unit 233 of the mobile terminal 20 or the like.

Also, based on the vehicle provision schedule information or the difference data corresponding to the updated portion, the schedule manager 323 automatically makes a reservation for a replacement vehicle for the vehicle providing user or an associate vehicle providing user (a vehicle 10 other than the owned vehicle) and a parking station as the return location during an owner user period. This is because, as described above, since it is possible to use the vehicle 10 in one way, there is a likelihood that the vehicle 10 will not have returned to the home location within the owner use period. Specifically, based on the updated vehicle schedule information DB 320A and the parking station schedule information DB 320B, for each of the latest one or more registered owner use periods, with setting the home location of the vehicle owned by the vehicle providing user as the departure location and the destination location, the schedule manager 323 extracts available vehicles 10 and available parking stations to be used as the return location in the vicinity of the departure location and the destination location (i.e., the home location). The schedule manager 323 selects a vehicle 10 and a parking station from among the extracted vehicles 10 and the parking stations as the return location according to predetermined conditions (e.g., the closest to the home location, the same riding capacity, type, etc., as those of the owned vehicle, etc.). Then, the schedule manager 323 additionally sets a use reservation for the selected vehicle 10 and for the selected parking station in the vehicle schedule information and in the parking station schedule information corresponding to the selected vehicle 10 and the selected parking station as the return location, respectively, for each of the owner use periods. Thereby, the car-sharing management server 30 can secure a replacement vehicle for the vehicle providing user or the associate vehicle providing user during each of the owner use periods.

Alternatively, for each of the latest one or more registered owner use periods, not limited to setting the home location as the departure location and the destination location, the schedule manager 323 may make a use reservation for a replacement vehicle and a parking station as the return location that corresponds to a destination location and a departure location according to desires of the vehicle providing user. For example, when making a registration setting of the vehicle provision schedule (owner use periods) on the user terminal (e.g., the mobile terminal 20A) described above, the vehicle providing user may specify the departure location and the destination location of a replacement vehicle for each of the owner use periods. Thereby, the schedule manager 323 can make a use reservation for a replacement vehicle and a parking station as the return location corresponding to the specified departure location and destination location for each of the latest one or more registered owner use periods. Also, the vehicle providing user may register in advance a departure location and a destination location for a use reservation for a replacement vehicle and a parking station as the return location with respect to an owner use period, in the car-sharing management server 30 (the controller 32) through a user terminal (e.g., a mobile terminal 20A). Thereby, the schedule manager 323 can make a use reservation for a replacement vehicle and a parking station as the return location that corresponds to the destination location and the departure location registered in advance, for each of the latest one or more registered owner use periods. Therefore, by specifying a departure location and a destination location in advance or when setting and registering the vehicle provision schedule, the vehicle providing user or the associate vehicle providing user can have a replacement vehicle and a parking station as the return location provided at his/her convenience. Therefore, the car-sharing management server 30 can improve the convenience to the vehicle providing user and associate vehicle providing users.

At this time, the schedule manager 323 may prioritize the use reservation of the replacement vehicle for the vehicle providing user or the associate vehicle providing user during the owner provision period, over a use reservation for a vehicle 10 from a user terminal. For example, even if the vehicle schedule information DB 320A corresponding to periods of a fixed length in the future are all updated based on the vehicle provision schedule information or the difference data corresponding to the updated portion, the schedule manager 323 does not immediately receive a use reservation from a user terminal with respect to any one of the updated latest car-sharing provision periods, but first, makes a use reservation for a replacement vehicle for the vehicle providing user or the associate vehicle providing user. Thereby, the car-sharing management server 30 can make a use reservation for a replacement vehicle for the vehicle providing user or the associate vehicle providing user before candidate vehicles 10 and candidate parking stations as the return destination location decrease due to use reservations from user terminals. Therefore, the car-sharing management server 30 can secure a replacement vehicle for the vehicle providing user or the associate vehicle providing user more securely during an owner use period.

Note that the schedule manager 323 does not have to secure a replacement vehicle for every one of the latest registered owner use periods. Also, the schedule manager 323 may secure replacement vehicles for only some periods among the owner use periods. In this case, for example, when setting and registering owner use periods on a user terminal as described above, the user may set (input) necessity or unnecessity of a replacement vehicle and hours during which a replacement vehicle is required for each owned vehicle registration period so as to reflect contents of these settings in the vehicle provision schedule information 230B. Thereby, the schedule manager 323 can recognize the necessity or unnecessity of a replacement vehicle and the hours during which a replacement vehicle is required, based on the updated vehicle provision schedule information received from the user terminal.

Also, in response to a request from a user terminal (e.g., the mobile terminal 20A) of the vehicle providing user, the schedule manager 323 may change the use reservation for either one of the replacement vehicle or the parking station as the return location for each owner use period registered in the vehicle schedule information. For example, in response to a request from a user terminal of the vehicle providing user, the schedule manager 323 may change the replacement vehicle registered for the use reservation with respect to a certain owner use period, which is located at a parking station in the vicinity of the home location of the owned vehicle during the period, to a replacement vehicle located at a parking station in the vicinity of the departure location different from the home location of the owned vehicle, during the period. Also, for example, in response to a request from a user terminal of the vehicle providing user, the schedule manager 323 may change the parking station registered for the use reservation with respect to a certain owner use period, at which the replacement vehicle can be returned in the vicinity of the home location of the owned vehicle during the period, to a parking station in the vicinity of the destination location different from the home location of the owned vehicle, during the period. Thereby, in the case where a use reservation is performed automatically for a replacement vehicle having the home location of the owned vehicle as the departure location and the destination location and for a parking station as the return location, if desiring to change at least one of the departure location and the destination location, the vehicle providing user or the associate vehicle providing user can have the use reservation for the replacement vehicle and the parking station as the return location changed accordingly. Therefore, the car-sharing management server 30 can further improve the convenience to the vehicle providing user.

Note that as described above, when automatically making a use reservation for a replacement vehicle corresponding to the destination location and the departure location and a parking station as the return location thereof according to desires of the vehicle providing user, as a matter of course, the schedule manager 323 may change the use reservations for either one of the replacement vehicle or the parking station as the return location for each owner use period registered in the vehicle schedule information or the use reservation in response to a request from a user terminal (e.g., the mobile terminal 20A) of the vehicle providing user. Thereby, similarly, the car-sharing management server 30 can further improve the convenience to the vehicle providing user.

The authentication key manager 324 (an example of a key information delivery unit) obtains from the vehicle management server 40 an authentication key of a vehicle 10 during a use period that corresponds to a use reservation registered in the vehicle schedule information DB 320A and the parking station schedule information DB 320B. At this time, as described above, use reservations to be processed include a use reservation received from a user terminal (e.g., the mobile terminal 20), and in addition, a use reservation for a replacement vehicle and the like with respect to a period for a vehicle providing user or an associate vehicle providing user to use the providing vehicle (owner provision period). Specifically, the authentication key manager 324 transmits to the vehicle management server 40 an authentication key issuance request that includes a vehicle ID corresponding to the vehicle 10, a user ID corresponding to the user who uses the vehicle 10, a use period identified in the use reservation, and the like. At this time, in the case of a use reservation with respect to a period for an associate vehicle providing user to use a providing vehicle, an authentication key issuance request is transmitted that includes a user ID corresponding to the specific associate vehicle providing user, which can be specified when a registration setting of the vehicle providing schedule is made by the vehicle providing user on a use terminal. For example, when the latest use reservation is registered in the vehicle schedule information DB 320A and the parking station schedule information DB 320B by the schedule manager 323, the authentication key manager 324 transmits an authentication key issuance request to the vehicle management server 40. Also, when the authentication key obtainment request is received from the mobile terminal 20, the authentication key manager 324 may transmit an authentication key issuance request to the vehicle management server 40. Thereby, the authentication key manager 324 can obtain (receive) an authentication key issued by the vehicle management server 40 in response to the authentication key issuance request from the vehicle management server 40. The authentication key manager 324 transmits the obtained authentication key information including an authentication key to the mobile terminal 20 of the target user. Also, the authentication key manager 324 registers the obtained authentication key information in the authentication key information DB 320C. Thereby, the car-sharing management server 30 can handle a case where a time difference is provided between the time to obtain an authentication key from the vehicle management server 40 and the time to deliver the authentication key to the mobile terminal 20, and a case where the authentication key needs to be delivered again for some reason.

Note that authentication key information corresponding to an authentication key that had been already used (in other words, delivered to the mobile terminal 20 and the use period has expired) may be deleted from the authentication key information DB 320C appropriately.

The vehicle use monitoring unit 325 monitors the use state from the start to the end of use of a vehicle 10 by a user in the C2C car-sharing.

The vehicle use monitoring unit 325 monitors whether or not the vehicle 10 is appropriately returned to the parking station as the return location within the use period of the vehicle 10. Specifically, the vehicle use monitoring unit 325 may issues a query for the positional information on the vehicle 10 to the vehicle management server 40, for example, when a predetermined time before the use end date and time has passed. Thereby, the vehicle use monitoring unit 325 can recognize where the vehicle 10 is located based on the positional information on the vehicle 10 replied from the vehicle management server 40. Therefore, the vehicle use monitoring unit 325 can monitor whether or not it is possible for the vehicle 10 to reach the parking station as the return location by the use end date and time. For example, the vehicle use monitoring unit 325 may transmit an alert to the mobile terminal 20 of the corresponding user in a situation where the vehicle 10 is located relatively far from the parking station as the return location although the predetermined time before the use end date and time has passed. Thereby, the car-sharing management server 30 can prompt the user to travel toward the parking station as the return location. Then, upon receiving the use end notice (which will be described later) transmitted from the mobile terminal 20 in response to an operation performed by the user, the vehicle use monitoring unit 325 determines that the vehicle 10 has been returned to the parking station corresponding to the valid return location, to end monitoring the use state of the vehicle 10 with respect to the corresponding use reservation.

Note that the vehicle use monitoring unit 325 may determine whether or not the vehicle 10 has been returned to the valid parking station, instead of the mobile terminal 20. In this case, the vehicle use monitoring unit 325 issues a query about the positional information to the vehicle management server in response to receiving the use end notice from the mobile terminal 20. Thereby, the vehicle use monitoring unit 325 can determine whether or not the vehicle 10 has been returned to the valid parking station based on the positional information on the vehicle 10 replied from the vehicle management server 40. Therefore, when the vehicle 10 is not returned to the valid parking station, the vehicle use monitoring unit 325 may issue an alert to the mobile terminal 20 of the corresponding user. Thereby, the car-sharing management server 30 can prompt the user to return to the correct parking station.

Configuration of Vehicle Management Server

The vehicle management server 40 includes a communicator 41 and a controller 42.

The communicator 41 is a device for bidirectionally communicating with external devices such as the vehicle 10 and the car-sharing management server 30 through a predetermined communication network.

The controller 42 performs various control processes in the vehicle management server 40. As functional units implemented by executing one or more programs stored in the ROM or the non-volatile auxiliary storage device on the CPU, the controller 42 includes, for example, an inter-vehicle communication interface (referred to as "inter-vehicle communication IF", below) 421, an inter-server communication interface (referred to as "inter-server communication IF", below) 422, a vehicle manager 423, and an authentication key issuer 424. The controller 42 also includes, for example, a storage 420 as a storage area defined in a non-volatile auxiliary storage device, an external storage device connected with a server computer, or the like.

In the storage 420, a vehicle information DB 420A is constructed.

The vehicle information DB 420A stores vehicle information uploaded from multiple vehicles 10 (e.g., positional information on the vehicles 10) in a form that the information can be extracted for each vehicle 10.

Among the vehicle information items in the vehicle information DB 420A, an information item that has a period of a certain length of elapsed time since the upload from the vehicle 10 may be deleted appropriately.

The inter-vehicle communication IF 421 transmits and receives various signals bidirectionally with each of the multiple vehicles 10 by using the communicator 41. The vehicle manager 423 and the like exchange signals with the vehicles 10 through the inter-vehicle communication IF 421.

The inter-server communication IF 422 transmits and receives various signals bidirectionally with the car-sharing management server 30 by using the communicator 41. The vehicle manager 423, the authentication key issuer 424, and the like exchange signals with the car-sharing management server 30 through the inter-server communication IF 422.

The vehicle manager 423 obtains the vehicle information from each of the multiple vehicles 10, and based on the newly obtained vehicle information, updates the vehicle information of each vehicle 10 in the vehicle information DB 420A. The vehicle information on the vehicle 10 may be uploaded from the vehicle 10 to the vehicle management server 40, for example, automatically according to a schedule set in advance, or may be uploaded from the vehicle 10 to the vehicle management server 40 in response to a command appropriately transmitted from the vehicle management server 40 to the vehicle 10. In the latter case, the vehicle manager 423 transmits a transmission command of vehicle information (e.g., the positional information on the vehicle 10) to the vehicle 10 in response to a request from the car-sharing management server 30, a schedule set in advance, or the like.

Also, in response to a query from the car-sharing management server 30, the vehicle manager 423 extracts the latest positional information on the vehicle 10 from the vehicle information DB 420A, or transmits a transmission command to the vehicle 10 to upload the latest positional information. Then, the vehicle manager 423 transmits (replies with) the latest positional information on the vehicle 10 to the car-sharing management server 30.

When the authentication key issuance request is received from the car-sharing management server 30, the authentication key issuer 424 generates a time-limited authentication key corresponding to the vehicle 10 (specifically, the key unit 12 of the vehicle 10), based on the vehicle 10 and the use period identified in the authentication key issuance request. Then, the authentication key issuer 424 transmits authentication key information including the authentication key issued to the car-sharing management server 30. At this time, the authentication key information includes information for the mobile terminal 20 to search for the key unit of the vehicle 10 (e.g., ServiceUUID or the like included in an advertising packet from the communicator 123 of the key unit 12, which will be referred to as "BLE connection information", below). Thereby, by obtaining the authentication key information through the car-sharing management server 30, the mobile terminal 20 (the controller 23) can detect the advertising packet from the key unit 12 of the vehicle 10 corresponding to the authentication key. Also, the authentication key issuer 424 also transmits the issued authentication key to the corresponding vehicle 10. Thereby, when receiving the authentication key from the mobile terminal 20, the vehicle 10 (the key unit 12) can determine that it is a valid authentication key.

Specific Example of Operations of Car-Sharing System (1)

Next, an example of specific operations of the car-sharing system 1 will be described with reference to FIG. 4A and FIG. 4B.

Figure 4A:
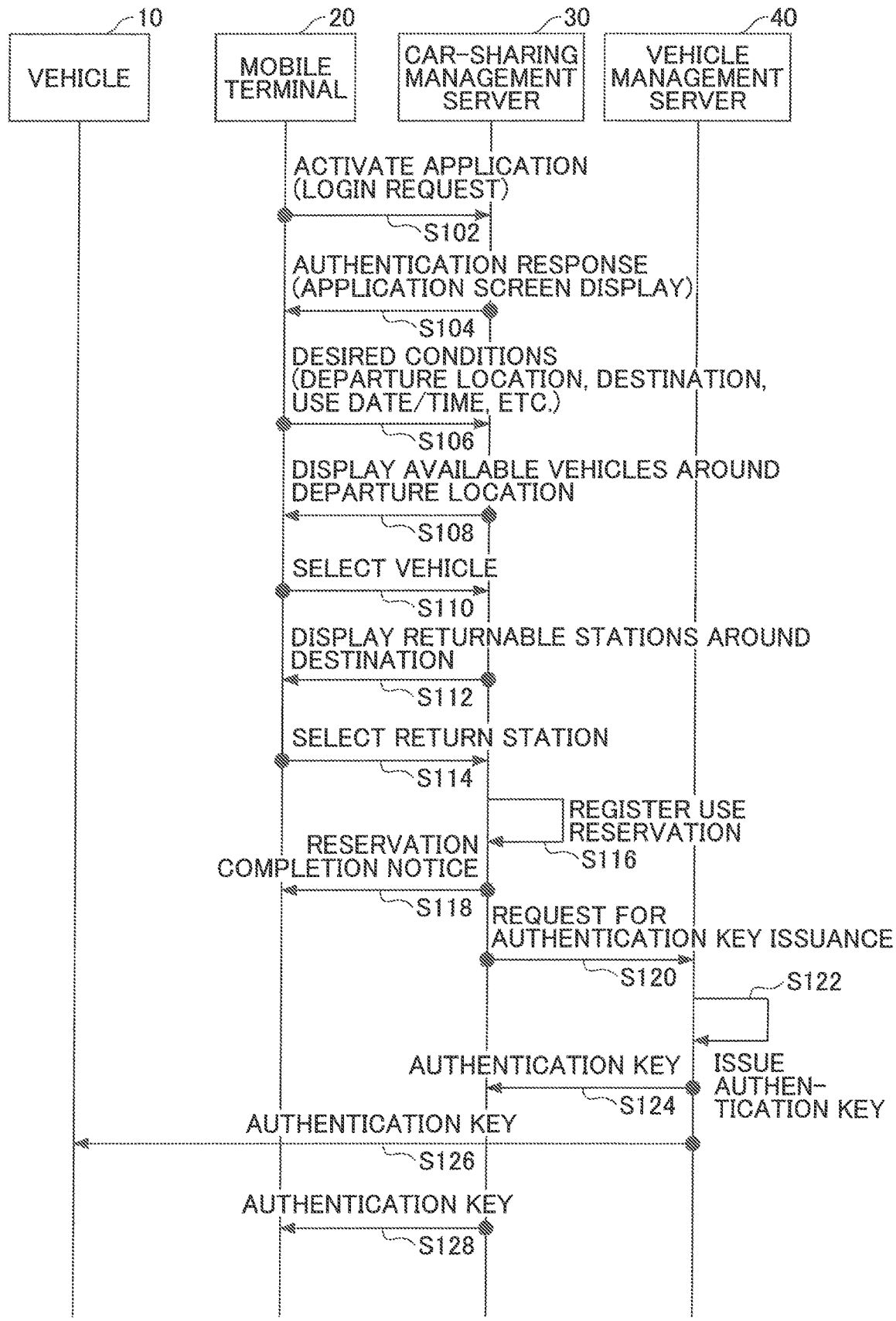
FIG. 4A is a sequence chart schematically illustrating an example of operations of a car-sharing system.
Figure 4B:
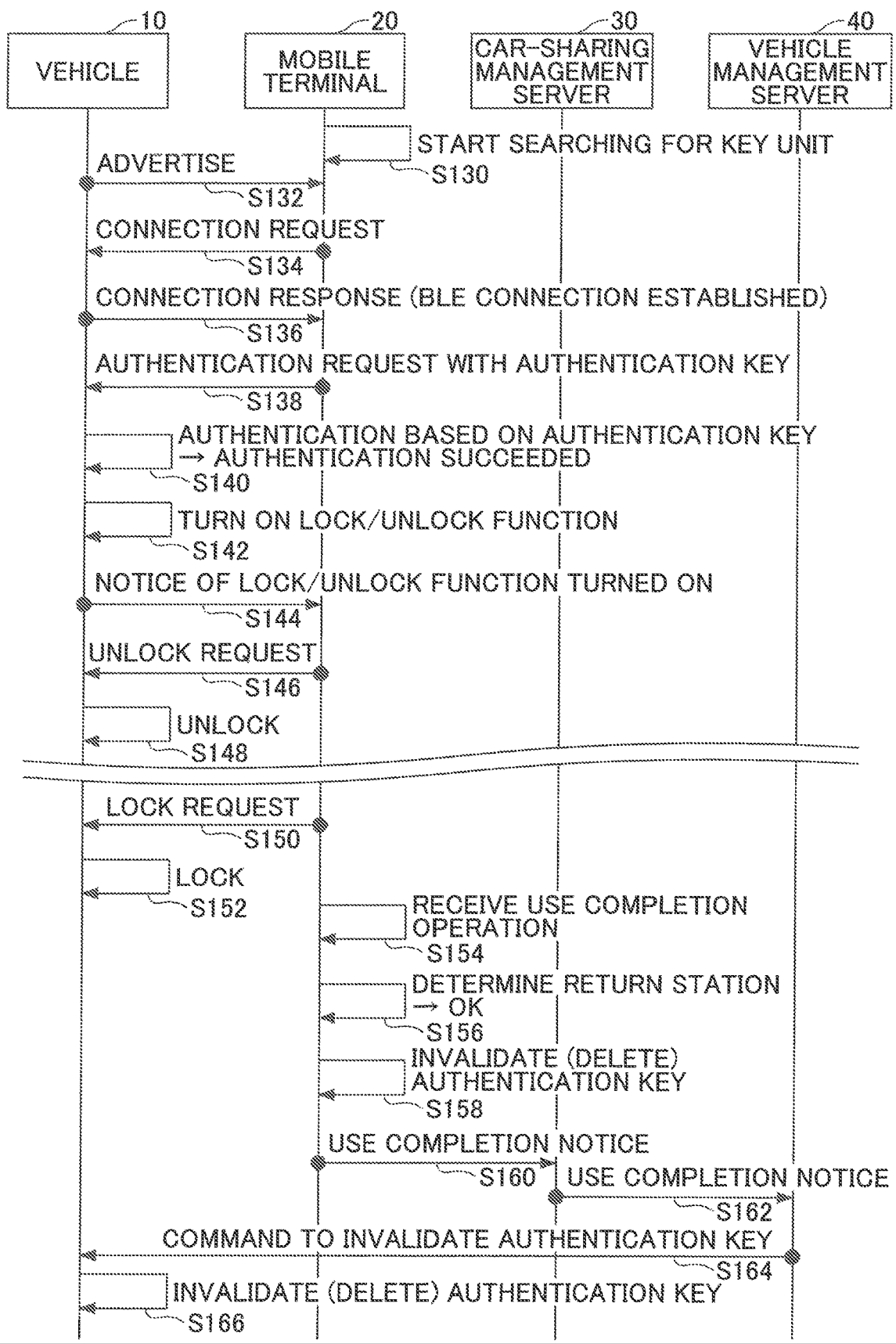
FIG. 4B is a sequence chart schematically illustrating an example of operations of a car-sharing system.

FIG. 4A and FIG. 4B are sequence diagrams schematically illustrating an example of operations of the car-sharing system 1. Specifically, FIG. 4A is a sequence chart schematically illustrating an example of operations starting with reception of a use reservation for a vehicle 10 from a user terminal (mobile terminal 20) until delivery of an authentication key to the mobile terminal 20 of the user. FIG. 4B is a sequence chart schematically illustrating an example of operations starting with use of the vehicle 10 by the user until returning the vehicle 10 after the use.

Note that in FIG. 4B, Steps S130 to S148 are operations of the car-sharing system 1 (the vehicle 10 and the mobile terminal 20) when starting the use of the vehicle 10, and Steps S150 to S166 are operations when ending the use of (when returning) the vehicle 10.

Operations Upon Reservation of Use of Vehicle by User

As illustrated in FIG. 4A, at Step S102, the mobile terminal 20 (the controller 23) activates the car-sharing application in response to an operation performed by the user through a touch panel or the like, and transmits a login request including the user ID and password input by the user to the car-sharing management server 30.

At Step S104, the car-sharing management server 30 (the controller 32) performs an authentication process based on the user ID and password, and upon successful authentication, replies with a response of the successful authentication to the mobile terminal 20. Thereby, on the display 25 of the mobile terminal 20, an application screen of the car-sharing application is displayed.

At Step S106, the mobile terminal 20 (the reservation unit 233) transmits a reservation candidate obtainment request including desired conditions (e.g., departure location, destination location, use period, etc.) input on a use reservation screen to the car-sharing management server 30 in response to an operation performed by the user.

At Step S108, the car-sharing management server 30 (the schedule manager 323) replies with information on candidate vehicles 10 that are available in the desired use period in the vicinity of the departure location to the mobile terminal 20 in accordance with the desired conditions. Thereby, on the display 25 of the mobile terminal 20, a vehicle selection screen including available vehicles 10 in the vicinity of the departure location is displayed (see FIG. 3).

At Step S110, in response to an operation performed by the user to select one vehicle 10 from among the candidates, the mobile terminal 20 (the reservation unit 233) transmits information on the selected vehicle 10 and the parking stations at the departure location to the car-sharing management server 30.

At Step S112, the car-sharing management server 30 (the schedule manager 323) replies with information on candidate parking stations that are available (at which the vehicle 10 can be returned) within the desired use period in the vicinity of the destination location in accordance with the desired conditions to the mobile terminal 20. Thereby, on the display 25 of the mobile terminal 20, a return location selection screen including available parking stations in the vicinity of the destination location is displayed (see FIG. 3).

At Step S114, in response to an operation performed by the user to select one parking station from among the candidates, the mobile terminal 20 (the reservation unit 233) transmits information on the selected parking station to the car-sharing management server 30.

At Step S116, the car-sharing management server 30 (the schedule manager 323) registers a use reservation for the vehicle 10 and the parking station, which includes a desired use period, the selected vehicle 10, the parking station at the departure location, the parking station at the destination location (return location), and the like.

At Step S118, upon completion of the registration of the use reservation, the car-sharing management server 30 (the schedule manager 323) transmits a reservation completion notice to the mobile terminal 20.

Also, upon completion of the registration of the use reservation, at Step S120, the car-sharing management server 30 (the authentication key manager 324) transmits an authentication key issuance request to the vehicle management server 40.

In response to the authentication key issuance request from the car-sharing management server 30, at Step S122, the vehicle management server 40 (the authentication key issuer 424) issues a time-limited authentication key corresponding to the vehicle 10 identified in the authentication key issuance request.

At Step S124, the vehicle management server 40 (the authentication key issuer 424) transmits authentication key information including the authentication key issued to the car-sharing management server 30.

Also, at Step S126, the vehicle management server 40 (the authentication key issuer 424) transmits the issued authentication key to the corresponding vehicle 10.

In response to receiving the authentication key from the vehicle management server 40, at Step S128, the car-sharing management server 30 (the authentication key manager 324) transmits the authentication key information including the authentication key to the mobile terminal 20 of the user corresponding to the authentication key.

Operations when Starting Use of Vehicle

As illustrated in FIG. 4B, in response to an operation performed by the user on the car-sharing application screen or when a predetermined time before the use start date and time of the vehicle 10 has passed, at Step S130, the mobile terminal 20 (the inter-vehicle communication IF 231) starts searching for the key unit 12. Specifically, based on the BLE connection information included in the authentication key information received from the car-sharing management server 30, the inter-vehicle communication IF 231 attempts to detect an advertising packet from the key unit 12 within the communication area of the communicator 21.

At Step S132, the vehicle 10 (the key unit 12) transmits the advertisement information toward a predetermined communication area in the vicinity of the key unit 12 (i.e., in the vicinity of the vehicle 10).

The transmission of the advertisement information by the key unit 12 of the vehicle 10 is intermittently repeated as described above.

At Step S134, the mobile terminal 20 (the inter-vehicle communication IF 231) detects the key unit 12 by receiving the advertisement information from the key unit 12, and transmits an authentication request to the detected key unit 12.

In response to the connection request from the mobile terminal 20, at Step S136, the vehicle 10 (the key unit 12) establishes a session of BLE communication with the mobile terminal 20, and transmits a connection response to the mobile terminal 20.

Once the session of BLE communication has been established with the key unit 12, at Step S138, the mobile terminal 20 (the vehicle operation unit 235) transmits an authentication request including the authentication key to the key unit 12.

At Step S140, in response to receiving the authentication request from the mobile terminal 20, the vehicle 10 (the key unit 12) performs an authentication process based on the authentication key included in the authentication request.

If the authentication is successful, at Step S142, the vehicle 10 (the key unit 12) turns on the locking/unlocking function of the key unit 12.

At Step S144, the vehicle 10 (the key unit 12) transmits a locking/unlocking-function-on notice to the mobile terminal 20.

At Step S146, in response to an unlocking operation performed by the user, the mobile terminal 20 (the vehicle operation unit 235) transmits an unlock request to the key unit 12.

At Step S148, in response to receiving the unlock request from the mobile terminal 20, the vehicle 10 (the key unit 12 and the lock/unlock/activation unit 11) unlocks the door. Thereby, the user can get into the driver's seat of the vehicle 10, activate the vehicle 10, and start using the vehicle 10.

Operations when Ending Use of (when Returning) Vehicle

At Step S150, in response to a locking operation performed by the user, the mobile terminal 20 (the vehicle operation unit 235) transmits a locking request to the key unit 12.

At Step S152, in response to receiving the lock request from the mobile terminal 20, the vehicle 10 (the key unit 12 and the lock/unlock/activation unit 11) locks the door.

At Step S154, in response to an operation performed by the user on the application screen of the car-sharing application being activated, the mobile terminal 20 (the controller 23) displays an operation screen for transmitting to the car-sharing management server 30 a notice of the end of use of the vehicle 10 (referred to as the "use end operation screen", below). Then, the mobile terminal 20 (the controller 23) receives an operation (referred to as the "use termination operation", below) indicating the end of use of the vehicle 10 by the user on the use termination operation screen.

At Step S156, the mobile terminal 20 (the controller 23) determines whether or not the vehicle 10 has been returned to the parking station as the valid return location, based on the positioning information in the GNSS module 24 (the positional information on the mobile terminal 20). The positional information and the like of the parking station as the return location may be obtained (received) from the car-sharing management server 30 in a form included in the authentication key information. Specifically, when a difference between the positional information on the mobile terminal 20 and the positional information on the parking station as the return location is within a predetermined range, the mobile terminal 20 (the controller 23) may determine that the vehicle 10 has been returned to the valid return location.

At Step S158, if having determined that the vehicle 10 has been returned to the parking station as the valid return location, the mobile terminal 20 (the controller 23) puts the authentication key (the authentication key information 230A) stored in the storage 230 into an unusable state, namely, invalidates the key. For example, the mobile terminal 20 (the controller 23) deletes the authentication key in the storage 230.

At Step S160, the mobile terminal 20 (the inter-server communication IF 232) transmits a use end notice to the car-sharing management server 30.

At Step S162, in response to receiving the use end notice of the vehicle 10 from the mobile terminal 20, the car-sharing management server 30 (the vehicle use monitoring unit 325) confirms the end of use of the vehicle 10 and stops monitoring the vehicle 10. Then, the car-sharing management server 30 (the vehicle use monitoring unit 325) transmits (transfers) the use end notice of the vehicle 10 to the vehicle management server 40.

At Step S164, in response to receiving the use end notice of the vehicle 10 from the car-sharing management server 30, the vehicle management server 40 (the controller 42) refers to a log of authentication keys issued by the authentication key issuer 424 to identify the authentication key, and transmits to the vehicle 10 an authentication key invalidation command including information on the identified authentication key.

At Step S166, in response to receiving the authentication key invalidation command, the vehicle 10 (the key unit 12) invalidates (e.g., deletes) the concerned authentication key. This completes a series of operations of the car-sharing system 1 with respect to a certain use reservation for a vehicle 10.

Specific Example of Operations of Car-Sharing System (2)

Next, another example of specific operations of the car-sharing system 1 will be described with reference to FIG. 5.

FIG. 5 is a sequence chart schematically illustrating another example of operations of the car-sharing system 1. Specifically, FIG. 5 is a sequence chart schematically illustrating operations of the car-sharing system 1 starting with a registration of a vehicle provision schedule by a vehicle providing user until start of using a replacement vehicle by the vehicle providing user.

Note that in this example (at Steps S224 and S226), assume that when the vehicle providing user is going to use an owned vehicle, the owned vehicle does not exist at the home location.

Operations when Registering Vehicle Delivery Schedule

Steps S202 and S204 are substantially the same as the processes at Steps S102 and S104 in FIG. 4A, and hence, the description will be omitted.

At Step S206, in response to an operation performed by the vehicle providing user, the mobile terminal 20A (the vehicle provision scheduler 236) registers a vehicle provision schedule for a period of a fixed length in the future, and updates the vehicle provision schedule information 230B in the storage 230.

At Step S208, the mobile terminal 20A (the vehicle provision scheduler 236) transmits the latest vehicle provision schedule, specifically, the updated vehicle provision schedule information or difference data corresponding to the updated portion to the car-sharing management server 30.

At Step S210, the car-sharing management server 30 (the schedule manager 323) updates the vehicle schedule information corresponding to the vehicle 10 in the vehicle schedule information DB 320A.

At Step S212, the car-sharing management server 30 (the schedule manager 323) makes a use reservation for another vehicle 10 (a replacement vehicle) and for a parking station as the return location with respect to an owner use period. Thereby, as described above, even if the owned vehicle of the vehicle providing user has not returned to the home location within the owner use period, the vehicle providing user can use the other vehicle 10 (the replacement vehicle) parked in a parking station in the vicinity of the home location of the owned vehicle.

Upon completion of the use reservation of the replacement vehicle during the owner use period, at Step S214, the schedule manager 323 transmits a replacement vehicle securing notice to the mobile terminal 20A of the vehicle providing user. Thereby, the vehicle providing user can confirm information on the use reservation for the replacement vehicle (e.g., information on the parking station where the vehicle 10 is parked) on a predetermined application screen of the car-sharing application displayed on the display 25 of the mobile terminal 20A.

Also, upon completion of the use reservation of the replacement vehicle for the vehicle providing user, at Step S216, the car-sharing management server 30 (the authentication key manager 324) transmits an authentication key issuance request to the vehicle management server 40.

At Step S218, in response to receiving the authentication key issuance request, the vehicle management server 40 (the authentication key issuer 424) issues a time-limited authentication key of the vehicle 10 corresponding to the replacement vehicle.

At Step S220, the vehicle management server 40 (the authentication key issuer 424) transmits authentication key information including the issued authentication key to the car-sharing management server 30.

At Step S222, the vehicle management server 40 (the authentication key issuer 424) also transmits the authentication key information including the issued authentication key to the vehicle 10.

Operations when Vehicle Providing User Starts Using Replacement Vehicle

At Step S224, in response to an operation performed by the vehicle providing user who has confirmed that the owned vehicle is not parked in a parking lot (parking station) at the home location, the mobile terminal 20A (the authentication key obtainer 234) transmits an authentication key obtainment request for the replacement vehicle to the car-sharing management server 30.

At Step S226, the car-sharing management server 30 (the authentication key manager 324) extracts authentication key information corresponding to the replacement vehicle from the authentication key information DB 320C, and transmits (replies with) the authentication key information to the mobile terminal 20A. Thereby, through a series of operations of the car-sharing system 1 similar to Steps S130 to S166 in FIG. 4B described above, the vehicle providing user can use the replacement vehicle and can return the replacement vehicle to the parking station as the return location.

Effects of Embodiments

As described above, in the present embodiment, the car-sharing system 1 performs operations related to C2C car-sharing, in which multiple vehicles 10 including at least one of a privately owned vehicle and a corporate-owned vehicle are shared among users, and the system is operated by a company different from a corporation providing a corporate-owned vehicle. Specifically, based on the vehicle schedule information in the vehicle schedule information DB 320A and the parking station schedule information in the parking station schedule information DB 320B, the schedule manager 323 receives, from a user through a user terminal, a use reservation for a vehicle 10 from among the plurality of vehicles 10 available at a parking station in the vicinity of a departure location of the user during a period desired by the user, and for a parking station from among the plurality of parking stations located in the vicinity of a destination location of the user at which the vehicle 10 can be returned at a time desired by the user, to register the use reservation in the vehicle schedule information in the vehicle schedule information DB 320A and the parking station schedule information in the parking station schedule information DB 320B. The authentication key manager 324 delivers key information for using the vehicle 10 corresponding to the use reservation registered in the vehicle schedule information, to a mobile terminal 20 of the user corresponding to the use reservation. Also, the schedule manager 323 makes a use reservation, with respect to a period registered in the vehicle schedule information for an owner of the vehicle 10 or a person connected with the owner to use the vehicle 10, for another vehicle 10 (a replacement vehicle) different from the vehicle 10 from among the plurality of vehicles 10 available during the period, and for a predetermined parking station from among the plurality of parking stations at which the replacement vehicle can be returned within the period; and registers the use reservation in the vehicle schedule information in the vehicle schedule information DB 320A and the parking station schedule information in the parking station schedule information DB 320B. Then, the authentication key manager 324 delivers key information for using the replacement vehicle to a mobile terminal 20 of the owner of the vehicle 10 or the person connected with the owner.

In this way, the car-sharing system 1 receives a use reservation for a vehicle 10 from among multiple vehicles 10 including at least one of a privately owned vehicle and a corporate-owned vehicle located in the vicinity of a departure location of a user during a period desired by the user. Therefore, when a large number of privately owned vehicles and corporate-owned vehicles are registered, the user can borrow a vehicle 10 in the vicinity of the departure location, for example, the home of the user or the like. Also, the car-sharing system 1 receives the use reservation for a parking station from among multiple parking stations in the vicinity of the destination location of the user at which the vehicle 10 can be returned at a time desired by the user. Therefore, by setting a destination location different from the departure location, the user can enjoy one-way use, which is to return the vehicle 10 to a parking station in the vicinity of the destination location. Meanwhile, the car-sharing system 1 automatically makes a use reservation for a replacement vehicle (another vehicle) different from the providing vehicle, with respect to a period for an owner of the vehicle 10 provided for shared use or a person connected with the owner (e.g., a family member, relative, close friend, etc. of the owner, referred to as "the owner or the like", below) to use the vehicle 10 (the providing vehicle). Therefore, the owner or the like providing the vehicle in the car-sharing service can use the replacement vehicle during a period registered in advance for the owner or the like to use the providing vehicle, even if the providing vehicle has gone to a parking station away from the home location due to one-way use. As such, the car-sharing system 1 realizes provision of a vehicle 10 in the vicinity of a departure location of a user, and one-way use of the vehicle 10 while maintaining convenience to the owner or the like of the vehicle 10, and thus, can further improve convenience to the users.

Also, in the present embodiment, the schedule manager 323 may make the use reservation, with respect to the period registered in the vehicle schedule information for the owner of the vehicle or the person connected with the owner to use the vehicle 10, for a vehicle 10 being parked at a parking station in the vicinity of a home location of the vehicle as the other vehicle (the replacement vehicle), and for a parking station in the vicinity of the home location of the vehicle 10 as the predetermined parking station; and register the use reservation in the vehicle schedule information in the vehicle schedule information DB 320A and in the parking station schedule information in the parking station schedule information DB 320B.

In this way, the car-sharing system 1 makes the use reservation for a replacement vehicle and a parking station as the return location in a form where the home location of the providing vehicle is set as the departure location and the destination location with respect to the period for the owner or the like to use the providing vehicle. Therefore, even if the providing vehicle has gone to a parking station different from the home location due to one-way use of the providing vehicle within the period for the owner or the like of the providing vehicle to use the providing vehicle, the owner or the like can use the replacement vehicle, and can return it to a parking station in the vicinity of his/her house.

Also, in the above embodiment, the schedule manager 323 may change, in response to a request from a user terminal corresponding to the owner of the vehicle 10 or the person connected with the owner, the replacement vehicle of the use reservation having been registered in the vehicle schedule information in the vehicle schedule information DB 320A with respect to the period for the owner of the vehicle 10 or the person connected with the owner to use the vehicle 10, to another replacement vehicle being parked in the parking station in the vicinity of the departure location different from the home location of the vehicle during the period.

In this way, in response to a request from a user terminal of the owner or the like of the providing vehicle, the car-sharing system 1 changes the replacement vehicle of the use reservation with respect to the period for the owner or the like to use the vehicle, to another replacement vehicle in the parking station in the vicinity of the departure location different from the home location of the providing vehicle. Therefore, since the owner or the like of the providing vehicle can change the departure location of the replacement vehicle afterward, the convenience to the owner or the like of the providing vehicle is improved.

Also, in the above embodiment, the schedule manager 323 may change, in response to a request from a user terminal corresponding to the owner of the vehicle 10 or the person connected with the owner, the predetermined parking station of the use reservation having been registered in the parking station schedule information in the parking station schedule information DB 320B with respect to the period for the owner of the vehicle or the person connected with the owner to use the vehicle 10, to a parking station in the vicinity of the destination location different from the home location of the vehicle.

In this way, in response to a request from a user terminal of the owner or the like of the providing vehicle, the car-sharing system 1 changes the parking station as the return location of the replacement vehicle of the use reservation with respect to the period for the owner or the like to use the vehicle, to a parking station in the vicinity of the destination location different from the home location of the providing vehicle. Accordingly, since the owner or the like of the providing vehicle can change the destination location of the replacement vehicle afterward, the convenience to the owner or the like of the providing vehicle is improved.

Also, in the above embodiment, the schedule manager 323 may make the use reservation, in response to a request from a user terminal corresponding to the owner of the vehicle 10 or the person connected with the owner, with respect to the period registered in the vehicle schedule information in the vehicle schedule information DB 320A for the owner of the vehicle or the person connected with the owner to use the vehicle 10, for a vehicle being parked at the parking station in the vicinity of the departure location specified in the request as the replacement vehicle, and for a parking station in the vicinity of the destination location specified in the request as the predetermined parking station; and registers the use reservation in the vehicle schedule information in the vehicle schedule information DB 320A and in the parking station schedule information in the parking station schedule information DB 320B.

In this way, the car-sharing system 1 makes a use reservation, with respect to the period for the owner or the like to use the vehicle, for a replacement vehicle and a parking station as the return location corresponding to the departure location and the destination location specified in a request from a user terminal of the owner or the like to use the providing vehicle. Therefore, when registering a schedule of the providing vehicle from a mobile terminal or the like of his/her own, the owner or the like of the providing vehicle may specify the departure location and the destination location for each period for the owner or the like to use the providing vehicle, so that he/she can have a replacement vehicle provided at his/her convenience. Therefore, the car-sharing system 1 can improve the convenience to the owner or the like of the providing vehicle.

Also, in the above embodiment, the schedule manager 323 may make the use reservation, with respect to the period registered in the vehicle schedule information for the owner of the vehicle or the person connected with the owner to use the vehicle 10, for a vehicle being parked at the parking station in the vicinity of the departure location registered in advance as the replacement vehicle, and for a parking station in the vicinity of the destination location registered in advance as the predetermined parking station; and register the use reservation in the vehicle schedule information in the vehicle schedule information DB 320A and in the parking station schedule information in the parking station schedule information DB 320B.

In this way, the car-sharing system 1 makes the use reservation with respect to the period for the owner or the like to use the providing vehicle, for a replacement vehicle and a parking station as the return location corresponding to the departure location and the destination location that are registered in advance. Therefore, by registering in advance the departure location and the destination location of the use reservation with respect to the period for the owner or the like to use the providing vehicle, the owner or the like of the providing vehicle can have a replacement vehicle provided at his/her convenience. Therefore, the car-sharing system 1 can improve the convenience to the owner or the like of the providing vehicle.

Also, in the above embodiments, the plurality of parking stations may include parking stations corresponding to home locations of at least some of the plurality of vehicles 10 registered in advance.

In this way, the car-sharing system 1 can use, as targets of shared use, not only the providing vehicle but also the home location of the providing vehicle (e.g., the parking lot at the home of the owner) as a parking station of another providing vehicle. Therefore, when a large number of privately owned vehicles and corporate-owned vehicles are registered, and consequently, the home locations of these vehicles that would be spread over various places are registered as parking stations, it becomes easier for the user to be provided with a vehicle in the vicinity of the departure location such as the home of the user and/or a parking station in the vicinity of the destination location. Therefore, the car-sharing system 1 can further improve the convenience to the user.

Also, in the above embodiments, the schedule manager 323 may prioritize, when registering in the vehicle schedule information in the vehicle schedule information DB 320A and in the parking station schedule information in the parking station schedule information DB 320B, a use reservation with respect to the period for the owner of the vehicle or the person connected with the owner to use the vehicle, over a use reservation received from the user terminal of the user.

Thereby, the car-sharing system 1 can more securely make the use reservation for the replacement vehicle with respect to the period for the owner or the like to use the providing vehicle, and the parking station as the return location. Therefore, the car-sharing system 1 can more securely maintain the convenience to the owner or the like of the providing vehicle.

As above, the embodiments for implementing the present inventive concept have been described in detail. Note that the present inventive concept is not limited to such specific embodiments, and various modifications and improvements may be made within the scope of the subject matters of the present inventive concept described in the claims.

For example, in the embodiments described above, although the authentication process of the mobile terminal 20 in the key unit 12 and the authentication process of the key unit 12 in the lock/unlock/activation unit 11 are doubly performed, the function of the key unit 12 may be integrated into the lock/unlock/activation unit 11, to omit the authentication process of the key unit 12. In other words, the lock/unlock/activation unit 11 may perform an authentication process of the mobile terminal 20 by an exchange with the mobile terminal 20 based on predetermined short-range communication as in the key unit 12 as described above, and if the authentication is successful, may directly perform locking, unlocking, activation, and the like of the vehicle 10 in response to an operation performed by the user.

The invention claimed is:

1. A car-sharing system for a car-sharing service in which a plurality of vehicles are shared to be used among a plurality of users, the car-sharing system comprising:
   a first storage configured to store vehicle schedule information on respective use schedules of the plurality of vehicles;
   a second storage configured to store parking station schedule information on respective use schedules of a plurality of parking stations arranged in advance for parking the vehicles;
   a processor programmed to:
      based on the vehicle schedule information and the parking station schedule information, receive, from a user through a user terminal, a use reservation for a vehicle from among the plurality of vehicles available at a parking station in a vicinity of a departure location of the user during a period desired by the user, and for a parking station from among the plurality of parking stations located in a vicinity of a destination location of the user at which the vehicle can be returned at a time desired by the user, and register the use reservation in the vehicle schedule information in the first storage and in the parking station schedule information in the second storage;
      deliver key information for using the vehicle corresponding to the use reservation registered in the vehicle schedule information, to a mobile terminal of the user corresponding to the use reservation;
      determine, based on preset schedule information, that an owner of the vehicle or a person connected with the owner requires a replacement vehicle when the vehicle is subject to the use reservation by the user who is different from the owner or the person connected with the owner;
      automatically make a second use reservation, with respect to a period registered in the vehicle schedule information for the owner of the vehicle or the person connected with the owner to use the vehicle, for the replacement vehicle, the replacement vehicle being different from the vehicle from among the plurality of vehicles, and for a predetermined parking station from among the plurality of parking stations at which said replacement vehicle can be returned within the period;
      automatically register the second use reservation in the vehicle schedule information in the first storage and in the parking station schedule information in the second storage; and
      deliver key information for using said replacement vehicle to a mobile terminal of the owner of the vehicle or the person connected with the owner,
   wherein the processor prioritizes, when registering the vehicle schedule information in the first storage and the parking station schedule information in the second storage, the second use reservation with respect to the period for the owner of the vehicle or the person connected with the owner to use the vehicle, by first making the second use reservation before making the use reservation received from the user terminal of the user, and
   wherein the car-sharing system further comprises:

(i) the mobile terminal of the user corresponding to the use reservation, and the mobile terminal of the user corresponding to the use reservation is configured to unlock the vehicle corresponding to the use reservation after receiving the key information for using the vehicle, or (ii) the mobile terminal of the owner of the vehicle or the person connected with the owner, and the mobile terminal of the owner of the vehicle or the person connected with the owner is configured to unlock the replacement vehicle after receiving the key information for using said replacement vehicle.

2. The car-sharing system as claimed in claim 1, wherein the processor makes the second use reservation, with respect to the period registered in the vehicle schedule information for the owner of the vehicle or the person connected with the owner to use the vehicle, for a vehicle that is parked at a parking station in the vicinity of a home location of the vehicle as said replacement vehicle, and for a parking station in the vicinity of the home location of the vehicle as the predetermined parking station; and registers the second use reservation in the vehicle schedule information in the first storage and in the parking station schedule information in the second storage.

3. The car-sharing system as claimed in claim 2, wherein the processor changes, in response to a request from a user terminal corresponding to the owner of the vehicle or the person connected with the owner, said replacement vehicle of the second use reservation having been registered in the vehicle schedule information with respect to the period for the owner of the vehicle or the person connected with the owner to use the vehicle, to another replacement vehicle being parked in the parking station in the vicinity of the departure location different from the home location of the vehicle during the period.

4. The car-sharing system as claimed in claim 2, wherein the processor changes, in response to a request from a user terminal corresponding to the owner of the vehicle or the person connected with the owner, the predetermined parking station of the second use reservation having been registered in the parking station schedule information with respect to the period for the owner of the vehicle or the person connected with the owner to use the vehicle, to a parking station in the vicinity of the destination location different from the home location of the vehicle.

5. The car-sharing system as claimed in claim 1, wherein the processor makes the second use reservation, in response to a request from a user terminal corresponding to the owner of the vehicle or the person connected with the owner, with respect to the period registered in the vehicle schedule information for the owner of the vehicle or the person connected with the owner to use the vehicle, for a vehicle being parked at the parking station in the vicinity of the departure location specified in the request as said replacement vehicle, and for a parking station in the vicinity of the destination location specified in the request as the predetermined parking station; and registers the second use reservation in the vehicle schedule information in the first storage and in the parking station schedule information in the second storage.

6. The car-sharing system as claimed in claim 1, wherein the processor makes the second use reservation, with respect to the period registered in the vehicle schedule information for the owner of the vehicle or the person connected with the owner to use the vehicle, for a vehicle being parked at the parking station in the vicinity of the departure location registered in advance as said replacement vehicle, and for a parking station in the vicinity of the destination location registered in advance as the predetermined parking station; and registers the second use reservation in the vehicle schedule information in the first storage and in the parking station schedule information in the second storage.

7. The car-sharing system as claimed in claim 1, wherein the plurality of parking stations include parking stations corresponding to home locations of at least some of the plurality of vehicles registered in advance.

8. An information processing method executed by an information processing apparatus for a car-sharing service in which a plurality of vehicles are shared to be used among a plurality of users, the information processing apparatus including a first storage and a second storage, the information processing method comprising:

reserving by, based on vehicle schedule information stored in the first storage and parking station schedule information stored in the second storage, receiving, from a user through a user terminal, a use reservation for a vehicle from among the plurality of vehicles available at a parking station in a vicinity of a departure location of the user during a period desired by the user, and for a parking station from among the plurality of parking stations located in a vicinity of a destination location of the user at which the vehicle can be returned at a time desired by the user, and then, registering the use reservation in the vehicle schedule information in the first storage and in the parking station schedule information in the second storage;

delivering key information for using the vehicle corresponding to the use reservation registered in the vehicle schedule information, to a mobile terminal of the user corresponding to the use reservation;

controlling the mobile terminal of the user corresponding to the use reservation to unlock the vehicle;

determining, based on preset schedule information, that an owner of the vehicle or a person connected with the owner requires a replacement vehicle when the vehicle is subject to the use reservation by the user who is different from the owner or the person connected with the owner;

automatically making a second use reservation, with respect to a period registered in the vehicle schedule information for the owner of the vehicle or the person connected with the owner to use the vehicle, for the replacement vehicle, the replacement vehicle being different from the vehicle from among the plurality of vehicles, and for a predetermined parking station from among the plurality of parking stations at which said replacement vehicle can be returned within the period;

automatically registering the second use reservation in the vehicle schedule information in the first storage and in the parking station schedule information in the second storage;

prioritizing, when registering the vehicle schedule information in the first storage and the parking station schedule information in the second storage, the second use reservation with respect to the period for the owner of the vehicle or the person connected with the owner to use the vehicle, by first making the second use reservation before making the use reservation received from the user terminal of the user;

delivering key information for using said replacement vehicle to a mobile terminal of the owner of the vehicle or the person connected with the owner; and controlling the mobile terminal of the owner of the vehicle or the person connected with the owner to unlock the replacement vehicle.

9. A non-transitory computer-readable recording medium having an information processing program stored thereon for causing the information processing apparatus to execute the information processing method as claimed in claim 8.

\* \* \* \* \*